US012204314B2

(12) United States Patent
Poelman et al.

(10) Patent No.: US 12,204,314 B2
(45) Date of Patent: Jan. 21, 2025

(54) METHOD AND APPARATUS FOR IMPROVED AUTO-CALIBRATION OF A ROBOTIC CELL

(71) Applicant: Bright Machines, Inc., San Francisco, CA (US)

(72) Inventors: Ronald Poelman, Wassenaar (NL); Barrett Clark, Seattle, WA (US); Oytun Akman, Oakland, CA (US); Matthew Brown, Seattle, WA (US)

(73) Assignee: Bright Machines, Inc., San Francisco, CA (US)

(*) Notice: Subject to any disclaimer, the term of this patent is extended or adjusted under 35 U.S.C. 154(b) by 238 days.

(21) Appl. No.: 17/454,217

(22) Filed: Nov. 9, 2021

(65) Prior Publication Data
US 2022/0147026 A1    May 12, 2022

Related U.S. Application Data

(60) Provisional application No. 63/198,757, filed on Nov. 10, 2020.

(51) Int. Cl.
G05B 19/418    (2006.01)
B25J 9/16    (2006.01)
(Continued)

(52) U.S. Cl.
CPC ...... *G05B 19/41815* (2013.01); *B25J 9/1653* (2013.01); *B25J 9/1671* (2013.01);
(Continued)

(58) Field of Classification Search
CPC .... G05B 19/41815; G05B 2219/39016; G06T 7/80; B25J 9/1653; B25J 9/1671; B25J 9/1692; B25J 19/023
See application file for complete search history.

(56) References Cited

U.S. PATENT DOCUMENTS 7,403,835 B2    7/2008    Sandner et al.
7,996,113 B2    8/2011    Yuan et al.
(Continued)

FOREIGN PATENT DOCUMENTS

CN    106426158 A    2/2017
CN    110795874 A    2/2020
(Continued)

OTHER PUBLICATIONS

Alexei Vassiliev, Designing The Built-In Microcontroller Control Systems of Executive Robotic Devices Using the Digital Twins Technology, 2019, pp. 1-5. https://ieeexplore.ieee.org/stamp/stamp.jsp?tp=&arnumber=8843814 (Year: 2019).
(Continued)

*Primary Examiner* — Ramon A. Mercado
*Assistant Examiner* — Mohamad O El Sayah
(74) *Attorney, Agent, or Firm* — Nicholson De Vos Webster & Elliott LLP; Judith Szepesi

(57) ABSTRACT

A robotic cell calibration method comprising a robotic cell system having elements comprising: one or more cameras, one or more sensors, components, and a robotic arm. The method comprises localizing positions of the one or more cameras and components relative to a position of the robotic arm using a common coordinate frame, moving the robotic arm in a movement pattern, and using the cameras and sensors to determine robotic arm position at multiple times during the movement. The method includes identifying a discrepancy in robotic arm position between a predicted position and the determined position in real time, and computing, by an auto-calibrator, a compensation for the identified discrepancy, the auto-calibrator solving for the elements in the robotic cell system as a system. The method includes modifying actions of the robotic arm in real time during the movement based on the compensation.

20 Claims, 16 Drawing Sheets

(51) Int. Cl.
    *B25J 19/02*      (2006.01)
    *G06T 7/80*      (2017.01)

(52) U.S. Cl.
    CPC ........... *B25J 9/1692* (2013.01); *B25J 19/023* (2013.01); *G06T 7/80* (2017.01); *G05B 2219/39016* (2013.01)

(56) References Cited

U.S. PATENT DOCUMENTS

| | | | |
|---|---|---|---|
| 8,346,392 | B2 | 1/2013 | Walser et al. |
| 9,508,148 | B2 | 11/2016 | Zhang et al. |
| 9,643,314 | B2 | 5/2017 | Guerin et al. |
| 9,671,777 | B1 | 6/2017 | Aichele et al. |
| 9,707,680 | B1 | 7/2017 | Jessen et al. |
| 9,796,083 | B2 | 10/2017 | Atohira et al. |
| 9,811,074 | B1 | 11/2017 | Aichele et al. |
| 9,840,007 | B1 | 12/2017 | Kuffner |
| 9,844,882 | B2 | 12/2017 | Takizawa et al. |
| 9,971,914 | B2 | 5/2018 | Maturana et al. |
| 10,279,480 | B1 | 5/2019 | Holson et al. |
| 10,456,915 | B1 | 10/2019 | Nikolaev |
| 10,475,240 | B2 | 11/2019 | Evans et al. |
| 10,576,635 | B2 | 3/2020 | Ogawa et al. |
| 10,596,700 | B2 | 3/2020 | Corkum et al. |
| 10,773,386 | B2 | 9/2020 | Yamauchi et al. |
| 10,782,668 | B2 | 9/2020 | Bank et al. |
| 10,875,176 | B2 | 12/2020 | Radrich et al. |
| 11,023,934 | B1 | 6/2021 | Jacobs et al. |
| 11,209,798 | B1 | 12/2021 | Michalowski et al. |
| 2006/0107507 | A1* | 5/2006 | Brose ............... B25J 9/1684 29/407.05 |
| 2007/0150100 | A1* | 6/2007 | Saraliev ........... H01L 21/68 700/245 |
| 2008/0013825 | A1 | 1/2008 | Nagatsuka et al. |
| 2009/0118864 | A1 | 5/2009 | Eldridge et al. |
| 2012/0265345 | A1 | 10/2012 | Nakahara |
| 2014/0046635 | A1 | 2/2014 | Kersh et al. |
| 2014/0148949 | A1* | 5/2014 | Graca ............... B25J 9/1682 700/248 |
| 2014/0297244 | A1 | 10/2014 | Maturana et al. |
| 2015/0134317 | A1 | 5/2015 | Maturana et al. |
| 2015/0239127 | A1 | 8/2015 | Barajas et al. |
| 2015/0321352 | A1 | 11/2015 | Debain et al. |
| 2016/0239013 | A1* | 8/2016 | Troy ............... B25J 9/1664 |
| 2016/0243704 | A1 | 8/2016 | Vakanski et al. |
| 2017/0079725 | A1 | 3/2017 | Hoffman et al. |
| 2018/0029232 | A1 | 2/2018 | Ouchi et al. |
| 2018/0126553 | A1* | 5/2018 | Corkum ........... B25J 9/1697 |
| 2018/0304467 | A1 | 10/2018 | Matsuura et al. |
| 2018/0315237 | A1 | 11/2018 | Byers et al. |
| 2018/0356895 | A1 | 12/2018 | Dailey et al. |
| 2019/0001573 | A1 | 1/2019 | Gulbrandsen et al. |
| 2019/0015163 | A1 | 1/2019 | Abhari et al. |
| 2019/0056928 | A1 | 2/2019 | Smal et al. |
| 2019/0084160 | A1 | 3/2019 | Liu et al. |
| 2019/0254754 | A1 | 8/2019 | Johnson et al. |
| 2019/0280405 | A1 | 9/2019 | Iwai et al. |
| 2019/0291277 | A1 | 9/2019 | Oleynik |
| 2019/0308320 | A1 | 10/2019 | Konishi |
| 2019/0339966 | A1 | 11/2019 | Moondhra et al. |
| 2019/0339967 | A1 | 11/2019 | Moondhra et al. |
| 2019/0350685 | A1* | 11/2019 | Saghatchi ........... A61C 8/0089 |
| 2019/0380794 | A1* | 12/2019 | Al Jewad ........... A61B 34/20 |
| 2019/0389060 | A1 | 12/2019 | Roy Chaudhuri et al. |
| 2020/0016758 | A1* | 1/2020 | Keller ............... B25J 9/1692 |
| 2020/0024853 | A1 | 1/2020 | Furrer et al. |
| 2020/0030979 | A1 | 1/2020 | Bank et al. |
| 2020/0078948 | A1* | 3/2020 | Krause ............... G06F 3/0346 |
| 2020/0086483 | A1 | 3/2020 | Li et al. |
| 2020/0147794 | A1 | 5/2020 | Kerrick et al. |
| 2020/0156251 | A1 | 5/2020 | Huang et al. |
| 2020/0159648 | A1 | 5/2020 | Ghare et al. |
| 2020/0171668 | A1* | 6/2020 | Lin .................... B25J 19/021 |
| 2020/0171671 | A1 | 6/2020 | Huang et al. |
| 2020/0206913 | A1 | 7/2020 | Kaehler |
| 2020/0206919 | A1* | 7/2020 | Nakayama ............... B25J 9/163 |
| 2020/0225655 | A1 | 7/2020 | Cella et al. |
| 2020/0265329 | A1 | 8/2020 | Thomsen et al. |
| 2020/0276714 | A1 | 9/2020 | Declerck et al. |
| 2020/0301510 | A1 | 9/2020 | Birchfield et al. |
| 2020/0306977 | A1* | 10/2020 | Islam ..................... B25J 9/1692 |
| 2020/0310394 | A1 | 10/2020 | Wouhaybi et al. |
| 2020/0342067 | A1 | 10/2020 | Yu et al. |
| 2020/0398435 | A1* | 12/2020 | Okura .................... B25J 9/1671 |
| 2021/0018903 | A1 | 1/2021 | Muneta et al. |
| 2021/0046639 | A1 | 2/2021 | Ravi et al. |
| 2021/0096824 | A1 | 4/2021 | Stump et al. |
| 2021/0101282 | A1* | 4/2021 | Yoneyama ............. B25J 9/1671 |
| 2021/0133670 | A1 | 5/2021 | Cella et al. |
| 2021/0138651 | A1 | 5/2021 | McGregor et al. |
| 2021/0141870 | A1 | 5/2021 | McGregor et al. |
| 2021/0178575 | A1 | 6/2021 | Riek et al. |
| 2021/0323167 | A1 | 10/2021 | Hemes et al. |
| 2021/0369353 | A1 | 12/2021 | Nikou et al. |
| 2021/0375439 | A1 | 12/2021 | McKinnon et al. |
| 2022/0147026 | A1 | 5/2022 | Poelman et al. |
| 2022/0219327 | A1 | 7/2022 | Riek et al. |
| 2023/0019873 | A1 | 1/2023 | Landon et al. |

FOREIGN PATENT DOCUMENTS

| | | | | |
|---|---|---|---|---|
| EP | 2498156 | A2 | 9/2012 | |
| EP | 2871544 | A2 | 5/2015 | |
| EP | 3476545 | A1 | 5/2019 | |
| EP | 3476549 | A1 | 5/2019 | |
| EP | 3705239 | A1 * | 9/2020 | ........... B25J 19/021 |
| JP | 2006-003236 | A | 1/2006 | |
| WO | 2012/027541 | A1 | 3/2012 | |
| WO | 2018/176025 | A1 | 9/2018 | |
| WO | 2018/196232 | A1 | 11/2018 | |
| WO | 2019/064916 | A1 | 4/2019 | |
| WO | 2019/113618 | A1 | 6/2019 | |
| WO | 2019/113619 | A1 | 6/2019 | |
| WO | 2020/053083 | A1 | 3/2020 | |
| WO | 2020/190272 | A1 | 9/2020 | |

OTHER PUBLICATIONS

Igor Azkarate Fernandez, Virtual commissioning of a robotic cell: an educational case study, 2019, pp. 1-6. https://ieeexplore.ieee.org/stamp/stamp.jsp?tp=&arnumber=8869373 (Year: 2019).
Final Office Action, U.S. Appl. No. 16/949,753, Feb. 17, 2022, 37 pages.
Fuchs et al., "Cooperative bin-picking with Time-of-Flight camera and impedance controlled DLR lightweight robot III", Intelligent Robots and Systems (IROS), 2010 IEEE/RSJ International Conference ON, IEEE, Oct. 18, 2010, pp. 4862-4867.
International Search Report and Written Opinion, PCT App. No. PCT/US21/72308, Mar. 7, 2022, 17 pages.
Lu et al., An on-line relative position and orientation error calibration methodology for workcell robot operations, Robotics and Computer Integrated Manufacturing, vol. 13, No. 2, Jun. 1, 1997, pp. 89-99.
Middelplaats et al., "Automatic Extrinsic Calibration and Workspace Mapping Algorithms to Shorten the Setup time of Camera-guided Industrial Robots", Jun. 11, 2014, pp. 1-144.
Maragkos et al., "Virtual Reality Assisted Robot Programming for Human Collaboration", 29th International Conference on Flexible Automation and Intelligent Manufacturing, Procedia Manufacturing, vol. 38, 2019, pp. 1697-1704.
Marc Priggemeyer, Interactive calibration and visual programming of reconfigurable robotic workcells, 2018, pp. 1936-1401. https://ieeexplore.ieee.org/document/8452707 (Year: 2018).
Niki Kousi, Digital twin for adaption of robots' behavior in flexible robotic assembly lines, 2019, pp. 121-127. https://www.researchgate.net/publication/330669566_Digital_twin_for_adaptation_of_robots%27_behavior_in_flexible_robotic_assembly_lines (Year: 2019).
Stefan Profanter, A Hardware-Agnostic OPC UA Skill Model for Robot Manipulators and Tools, 2019, pp. 1061-1068. https://

(56) References Cited

OTHER PUBLICATIONS ieeexplore.ieee.org/stamp/stamp.jsp?tp=&arnumber=8869205&isnumber=8868236 (Year: 2019).

Wikipedia, "Digital Twin", Available Online at <https://en.wikipedia.org/w/index.php?t%20itle=Digital%20twin&oldid=924505803#Industry%20-level%20dynam,cs>, Nov. 4, 2019, 16 pages.

Hatem Fakhurldeen, CARA system Architecture—A Click and Assemble Robotic Assembly System, 2019, pp. 5830-5835. https://ieeexplore.ieee.org/stamp/stamp.jsp?tp=&arnumber=8794114 (Year: 2019).

Madimir Kuliaev, Towards Product Centric Manufacturing: From Digital Twins to Product Assembly, May 2019, pp. 164-170. https://ieeexplore.ieee.org/stamp/stamp.jsp?tp=&arnumber=8972137 (Year: 2019).

Garrett Thomas, Learning Robotic Assembly from CAD, 2018, pp. 1-8. https://arxiv.org/pdf/1803.07635.pdf (Year: 2018).

Alexander Perzylo, Intuitive Instruction of Industrial Robots: Semantic Process Descriptions for Small Lot Production, 2016, pp. 1-6. https://ieeexplore.ieee.org/stamp/stamp.jsp?tp=&arnumber=7759358 (Year: 2016).

Solhaug Linnerud, CAD-based system for programming of robotic assembly processes with human-in-the-loop, Jul. 2019, pp. 2303-2308. https://ieeexplore.ieee.org/stamp/stamp.jsp?arnumber=8781385 (Year: 2019).

Ming-Yu et al., "Fast object localization and pose estimation in heavy clutter for robotic bin picking", The International Journal of Robotics Research, [Online] vol. 31, No. 8, Jul. 2012 (Jul. 2012), pp. 951-973, XP055975134.

Shure Loren: "Carving a Dinosaur", Dec. 16, 2009 (Dec. 16, 2009), pp. 1-9, XP055975843.

\* cited by examiner

METHOD AND APPARATUS FOR IMPROVED AUTO-CALIBRATION OF A ROBOTIC CELL

RELATED APPLICATION

The present application claims priority to U.S. Provisional Application No. 63/198,757, filed on Nov. 10, 2020, and incorporates that priority application in its entirety.

FIELD

The present invention relates to calibration, and more particularly to automatic calibration of a robotic cell.

BACKGROUND

Robotic assembly is becoming common with various types of devices assembled automatically. However, setting up, and maintaining such robotic assembly systems still requires calibration by experts.

A robotic assembly unit generally includes a significant number of parts, each of which has to be calibrated. Each of these elements generally has a separate calibration routine, which must be run. These calibrations then must be coordinated, to get everything calibrated.

This is a slow and high precision process, that is time consuming and requires expertise.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

Figure 1A:
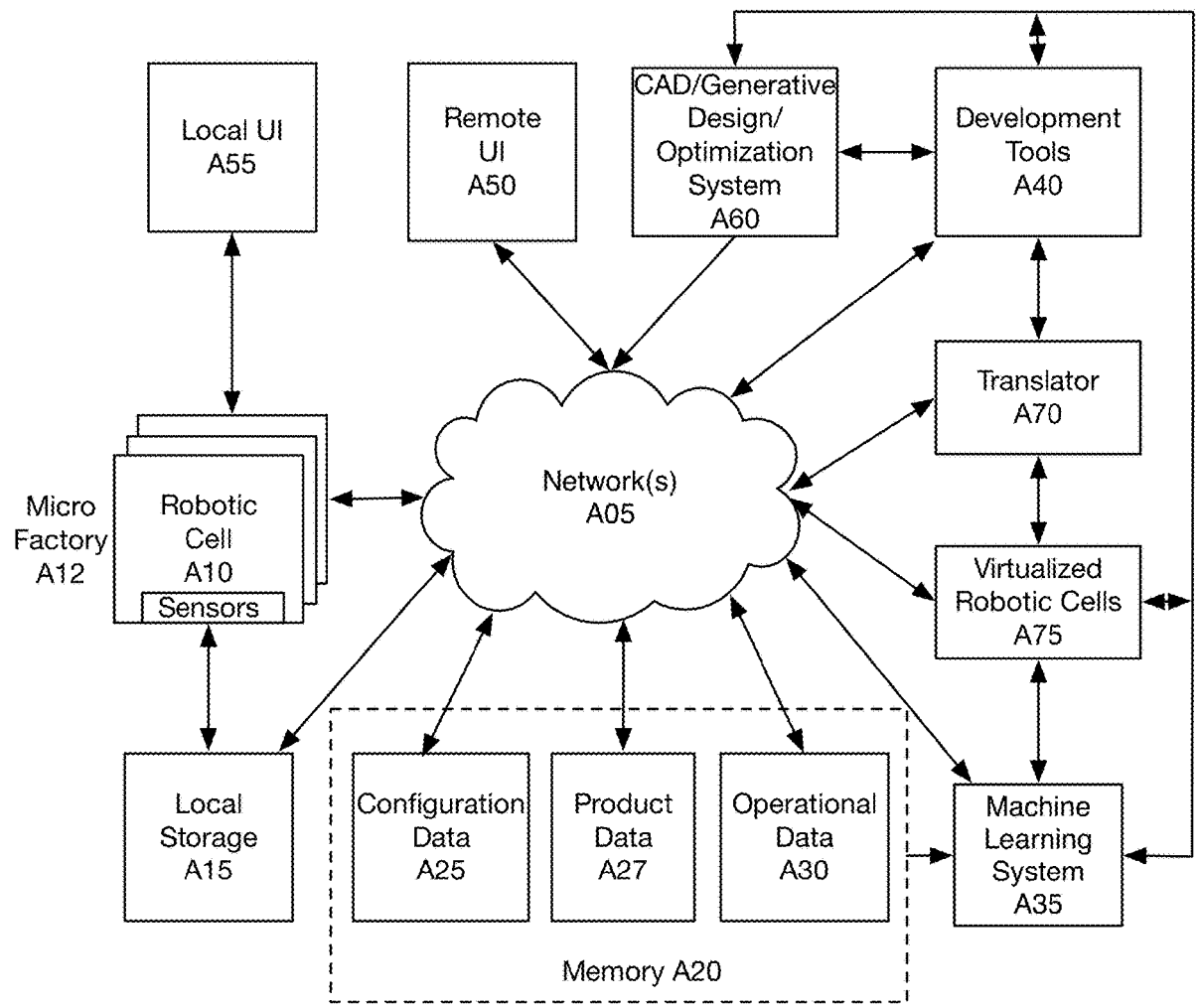
FIG. 1A is an overview block diagram of a system for a robotic factory.

Auto-calibration of a robotic cell used for manufacturing or assembly is described. A "robotic cell" for the purposes of this description is any assembly or manufacturing machine that is computer controlled. For example, a robotic cell may be a modular robotic system for assembly, a computer numerical control (CNC) machine, 3D printer, automated optical inspection (AOI) system, solder paste inspection (SPI), automated x-ray inspection (AXI) machine, or any other device that includes at least one camera and is controlled by computers. This system can be used to replace what was previously manually done by integrators, assembling the parts to a robotic cell, and monitoring the robotic cell during manufacture.

By building up a holistic or system view of a robotic cell and its working area the auto-calibration system can provide high accuracy and precision, an iterative feedback loop, constant pose refinement, and camera refinement. Furthermore, in one embodiment, the auto-calibration system can accomplish this with off-the shelf pieces, rather than customized assemblies. In one embodiment, a plurality of low cost cameras may be used, in combination with geometric fiducial constraints, to provide high accuracy at a reduced cost and complexity. Auto-calibration may be used to encompass the entirety of the robotic cell environment, including all elements in a system, also referred to as a holistic view, a system view, or solving as a system. For example, in a modular robotic assembly system this may include one or more cameras and/or other sensors, a robotic arm, end of arm tools, the tray on which parts and additional tools are located, the conveyor which moves work pieces into and out of the robotic assembly system, and the individual work pieces. In one embodiment, the holistic view of the working area includes all elements, whether they are stationary or movable, and tracks and/or calibrates all elements.

Auto-calibration is possible in one embodiment using a combination of camera lens calibration, frame registration, end of arm tool contact calibration, robot pose error compensation, and calibration monitoring and using a feed forward control and constant correction to maintain calibration over time. Camera lens calibration calibrates the camera's sensor and lens distortions and errors, which is used for calibration of the other elements. Frame registration establishes the relative positions and orientations of everything within the workspace with respect to each other or to a shared coordinate system. End of arm tool contact calibration in one embodiment is referred to as tool center point (TCP) calibration, which calibrates the tool tip locations of interest, or tool lines of interest, or tool contact planes of interest that interface the tool with a product or work piece. The end of arm tool contact calibration may have a position in space as well as an orientation. The combination of all positions and orientations of interest for a component is called a pose. The contact point may be a dynamic fluid or plasma, as in soldering or welding. Robot pose error compensation provides an adjustment to compensate for the effect of the accumulated inaccuracies of manufacturing, wear, and other causes of inaccuracies in the components of the robotic arm or other component. Robot pose errors may be caused a variety of sources such as mechanical hysteresis, backlash, thermal expansion, and loading. In one embodiment, calibration monitoring provides continuous monitoring of the calibration state of the robotic cell system, and constant correction. Thus, the system calibrates the dynamic and static components in the robotic cell, and uses a learning process to model the dynamic and static components.

In one embodiment, the robotic cell structure includes a frame, a robotic arm, and a work area defined by the volume of space in which the robotic arm and parts which are worked on are present. The frame is often one of the most rigid parts of the robotic cell, which may be used as the position for the cameras, and an origin point or root. The system is designed, in one embodiment, to create a holistic representation of the work area including the elements of the robotic cell itself as well as the product, or work pieces, within the structure.

In one embodiment, one or more fiducials which are observable from various vantage points in the work area, are affixed to the robotic cell structure. In one embodiment, the fiducials are distributed through the work area (or volumetric distribution), so that each camera always sees at least one fiducial affixed to the work area, in addition to any fiducials on the robotic arm and/or a calibration board or other assembled element held by the robotic arm. However, even such "rigid" parts aren't truly rigid because robotic cells are physically moved, or someone may hit the cell or otherwise shift the robotic cell structure in a way to displace the rigid parts. Additionally, wear and tear may cause movement or displacement. The present system, in one embodiment, can identify such displacements so that the robotic cell structure may be re-calibrated when such a shift occurs.

In one embodiment, instead of, or in addition to, fiducials, the system may utilize natural features within the robotic cell. Natural features may any visually observable natural or man-made elements that are visible within the working area of the robotic cell, such as surface holes, product edges, corners, shapes found in marble, wood grain, paint speckle, printed patterns, and more.

In addition to fiducials, or identified natural features, on the frame structure, the system may include a plurality of other fiducials, or identified natural features, including at the end of arm. In one embodiment, for calibration one or more calibration boards or pieces moved by the robotic arm may also be used. In one embodiment, the fiducials are geometric fiducial constraints. In one embodiment, the robotic arm includes a plurality of fiducials/patterns for calibration. The fiducials may be positioned on each link, on the tool relative to the end of arm tool contact, near each joint. In one embodiment, the fiducials are used by identifying their center points, and using the center points for calibration and measurement. In another embodiment, fiducials may be used by using another feature of the fiducial. In general, any consistently identified point, whether directly identified or identified in relation to another point, whether on a fiducial or as a natural feature, may be used.

The robotic cell system also includes a plurality of cameras, in one embodiment. At a minimum, the robotic cell includes one camera. In one embodiment, cameras are rigidly mounted to the most rigid portion of the frame, on the top, side, and other positions. In another embodiment, the cameras may be mounted in other position(s). In one embodiment, a camera may be mounted at end-of-arm. In one embodiment, the field of view of each camera can observe a minimum set of fiducials in a volumetric layout. In one embodiment, all positions and locations within the work area are observable by at least two cameras. The cameras are calibrated, in one embodiment, to determine distortion models. In one embodiment, the system utilizes a set of cameras to provide the holistic view of the workspace. In one embodiment, the data from the cameras is integrated to provide a stereoscopic view or multi-camera view to provide a 3D space view, rather than individual 2D images. In another embodiment, a monocular camera maybe used for the workspace.

In one embodiment, in addition to cameras, additional sensors such as magnetic sensors, infrared (IR) sensors, and other sensors may also be mounted within, or outside, the robotic cell to monitor the working area. Other sensors which may be part of the robotic cell may include one or more of sound sensors, vibration sensors, motor torque sensors, force sensors (load cells), motion sensors for sensing velocity and/or acceleration, light sensors, and temperature sensors. In one embodiment, the system integrates all of this sensor data to accurately represent the environment as a systemic representation.

In one embodiment, the system sets up a point of origin (0, 0, 0) frame of reference for the cell, to which all locations are referenced. In one embodiment, the point of origin is set up with respect to the most rigid part of the cell. This point of origin is the reference point for the cell. In one embodiment, it is established using a fiducial on the most rigid part of the frame, and one or more cameras attached to the most rigid part of the frame. In one embodiment, additional cameras may be mounted on other parts of the robotic cell. In one embodiment, the system acquires accurate coordinate locations for the centers of the fiducials with overview and/or internal measurement technology. In another embodiment, the system may utilize natural or man-made visual features, or other points of a fiducial. The coordinate locations for the fiducials are with respect to the point of origin frame reference, also referred to as the virtual origin frame (0,0,0), in one embodiment.

The system uses the virtual origin frame to localize the cameras in space, relative to the robotic cell. In one embodiment, the process then creates a map, including accuracy v. precision curves. The map is continuously updated, in one embodiment.

In one embodiment, the system observes the cell with the localized cameras and sensors, while the robotic arm performs different tasks under varying loads, traveling at varying speeds, and moving along varying paths to create a model of the cell's operation given different environmental states. In one embodiment, other factors, such as the distribution of weight of a tool or board held by the robotic arm, temperature, and other factors may also be varied to model the cell's operation more completely.

In one embodiment, the system provides a system level or holistic view of the robotic cell, including the work area and robotic arm. In one embodiment, this is done in part by using the virtual origin frame as a constant reference point on the frame of the cell for all calculations and position determinations. In one embodiment, the system builds an accuracy map, localizing elements throughout the robotic cell, with metrics for accuracy. By using metrics from the calibrations to map the accuracy, and updating this mapping continuously, the system can determine whether the accuracy map for the areas of the cell change over time. These kinds of changes can then be accounted for in calculating movements and positions of elements within the cell.

In one embodiment, a calibration process is used, which automatically finds the fiducials in the camera's field of view and determines the pose and identity of all elements within the work area of the robotic cell. A "pose" includes both position (xyz) and orientation around the position (pitch, yaw, roll). The cameras are then located, with respect to the virtual origin frame.

In one embodiment, the process creates paths for the robotic arm that are observable from the camera(s). The process may select a path utilizing an error minimization framework to compute the best possible localization of what is visible in the observable volume of the cell. In other words, a path is selected that facilitates movements of one or more of the various movable components (robot, tools, trays, parts, and pallets, and/or robot mounted cameras) such that data can be captured (camera images, or data from other sensors).

The ecosystem has a variety of potential sources of errors—for example lens distortions for each camera, robot motion backlash, hysteresis, thermal expansion, etc. The auto-calibration system solves for these errors at the system level, holistically as an ecosystem, taking into account contributions from all potential error sources. For example, if the tool isn't where it is expected to be, the error might be due to lens distortion, or due to robot motion backlash, or both. To decide how much error is caused by the lens vs. backlash, the system can utilize data from other sensors in the system—but those other sensors may have their own errors. Thus, solving for the source of one error depends on other sensors with other errors. It is a system of simultaneous equations and constraints.

A constraint might be that the system can assume that the fiducials are on flat surfaces—this enables verifying whether there is lens distortion. If a lens is distorted, it would make the fiducial look like it is on a non-flat surface. The system can then correct for the lens distortion. The algorithm can solve the compound system by a series of multiple sensor observations and constraints as a global ecosystem and refine (iteratively and/or directly). One way to describe this is "global error minimization and optimization by holistic mathematical analysis of observations and constraints across multiple objects and features of interest." This framework can be used for camera, robot, and end of arm tool contact calibration. In one embodiment, this framework is used for optimization by pose error minimization and re-projection error minimization.

The system utilizes models of each object such as constraints, weights, and properties, calculates probabilities, and applies geometric and structural analysis. A set of correction parameters are applied to each sensor and the system models the mechanical behavior of each tool/component/object/feature, such that the corrected observations are rigorous and self-consistent, with each other and with reality.

In one embodiment, this framework can use constraints on fiducials, such as location (with accuracy map), orientation, static/dynamic (fiducials on the frame v. on the robotic arm), planarity, etc.

In one embodiment, the system continuously performs mini-calibrations. In one embodiment this is done during idle cycles of the processor, with data captured by the cameras and/or sensors. In one embodiment, a watch-dog process monitors the mini-calibrations to identify when a full re-calibration is needed. In one embodiment, over time the data is used in a machine learning system to fine-tune when calibration is needed, and identify what changes or occurrences lead to a need for recalibration. This may be used to improve the robotic cell itself, or address issues that knock cells out of calibration. In one embodiment, a user interface provides a way to display the calibration output, and statistics. Over time, this may lead to improved cell design, as issues which cause the cell to become unstable or require recalibration are identified and eliminated.

In one embodiment, the calibration data is stored, and used in the steady state operation of the robot.

In one embodiment, the robotic cell, once calibrated operates using a state-dependent machine learning feed-forward-model.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

FIG. 1A is an overview block diagram of a system for a robotic factory. FIG. 1A is a simplified block diagram of one embodiment of a system in which robotic cells may be implemented. In one embodiment, robotic cells A10 include one or more individual robotic cells which together form the software defined manufacturing line, or micro factory A12. In one embodiment, individual robotic cells A10 may be linked via conveyors, and reverse conveyors, so that a single item being manufactured or assembled through the micro factory passes through one or more robotic cells A10 (or multiple times through one or more cells A10). The robotic cells A10 may provide manufacturing, assembly, inspection, and/or testing of products. For simplicity the term "manufacturing" will be used, however it should be understood that this term is being used for any process which is part of making a product, including inspection, manufacturing, validation, and testing.

In one embodiment, the robotic cells A10 are controlled by software. In one embodiment, the configuration and control data for the robotic cells A10 are applied to the cell from memory A20. In one embodiment, the memory A20 may be part of a remote system, coupled to the robotic cells A10 via network A05. The configuration data A25 defines the software configuration for each robotic cell A10 and the manufacturing line. Each robotic cell is calibrated prior to use. In one embodiment, the robotic cells A10 are also continuously calibrated, as will be described below in more detail.

In one embodiment, the robotic cells A10 collect operational data while being calibrated, tested, and used. This operational data A30 is stored in memory A20 and used by machine learning system A35. In one embodiment, local storage A15 provides backup for configuration data for the robotic cell, as well as operational data produced by the robotic cell while it is in use. Local storage A15 in one embodiment acts as a buffer for memory A20. In one embodiment, if the robotic cell A10 becomes disconnected from the network A05, it may continue to operate and collect real time operational data, using local storage A15. This also enables offline operation of a robotic cell A10.

In one embodiment, because the cells are software configured, a single robotic cell A10 may perform multiple stages in the manufacturing process and may be reconfigured during the manufacturing process. In one embodiment, this also enables the substitution of robotic cells A10 in a micro factory during manufacturing without extensive reconfiguration. In one embodiment, this also permits the addition of cells into a micro factory.

In one embodiment, robotic cells A10 include a local user interface A55, enabling interaction with the robotic cell A10 on the manufacturing floor. In one embodiment, the local user interface A55 may provide a joystick based interaction, enabling direct control of the elements of the robotic cell.

In one embodiment, in addition to the local UI A55 there may be a remote UI A50, coupled to the robotic cell A10 via a network A05. The remote user interface A50 may be a portable user interface, such as a tablet. The remote user interface A50 may be linked to the robotic cell A10 via a local area network (LAN), personal area network (PAN), or another type of network. In one embodiment, some remote UIs A50 may require proximity to a robotic cell A10, while other remote UIs A50 may be operable from anywhere. In one embodiment, the functionality and control elements presented on a user interface may vary based on one or more of the robotic cell A10, the configuration of the robotic cell A10, the identity/qualifications of the individual who is logged into the user interface, and proximity to the physical cell. In one embodiment, the local UI A55 and remote UI A50 provide identical human-machine-interface (HMI) elements, layouts, and functionality, reducing complexity for the operators interacting with the robotic cells A10. In one embodiment, the user interface provides a unified HMI across all robotic cell types and configurations.

In one embodiment, for the production of an end product, the process starts with development tools A40. In one embodiment, these tools may be made available to designers remotely. In one embodiment, these tools may be provided online, through a Software as a Service (SaaS) type interface. In one embodiment, the development tools A40 enable the design of a manufacturing line including one or more robotic cells A10. In one embodiment, teach robotic cell A10 has certain capabilities. The development tools A10 enable a user to design a manufacturing line using one or more of the robotic cells A10 to create the end product.

In one embodiment, CAD/Generative Design tools A60 may be used to create a CAD design for the end product to be made. In one embodiment, when using CAD/Generative Design tools A60 the system may take into account the manufacturing/assembly limitations of the robotic cells A10 in designing the end product. In one embodiment, the CAD/Generative Design tools A60 may receive data from development tools A40, and may iterate the end product design based on issues identified through the development tools A40. The output of the development tools A40 is a sequence of operations for each robotic cell.

Once a design is generated, translator A70 translates the sequence of operations to control commands for an individual robotic cell. In one embodiment, the output of development tools A40 is in a language which describes the configuration and actions taken by a robotic cell. Because each individual robotic cell includes multiple elements, which may utilize different control languages, the translation is quite complex. Furthermore, different robotic cells performing the same sequence of operations may have elements that are from different manufacturers, or have different configurations. For example, a robotic arm may have a plurality of movement joints, and the joints may have different limitations. Thus, a single command in the sequence of operations may be translated differently for each individual robotic cell.

The translated control commands may be applied to a virtualized robotic cell A75, or virtual representation of the robotic cell system. The virtualized robotic cell A75 is a software representation of the individual configured robotic cell, and may be used for testing, and verification, also referred to as "digital twin" because in one embodiment it is configured to simulate the actual robotic cell. In one embodiment, virtualized robotic cells A75 may use operational data A30 from actual robotic cells A10 to enable a user to view the actions of a physical robotic cell A10 remotely. In one embodiment, a user may preview the robotic cell's actions during a process, may track the actual actions during the process, and/or review the actual actions after the process using virtualized robotic cells A75.

The output of the translator A70, once validated and verified, is stored as configuration data A25. The configuration data A25 is applied to physical robotic cells, as discussed above.

In one embodiment, a machine learning system A35 is used to provide data for iterative learning, and improvements to the process.

In one embodiment, although the elements here are shown as individual elements one of skill in the art would understand that the design tools A60, development tools A40, translator A70, virtualized robotic cells A75, and machine learning system A35 are implemented on one or more computer systems. The computer systems may be stand-alone devices, servers, or cloud-based systems which are accessed through network A05. In one embodiment, the elements described may be implemented on a single server system. In one embodiment, the elements described may be implemented on multiple unrelated computer/server systems. In one embodiment, though only a single block is illustrated for an element like development tools A40 the real tool may be distributed over multiple devices.

Figure 1B:
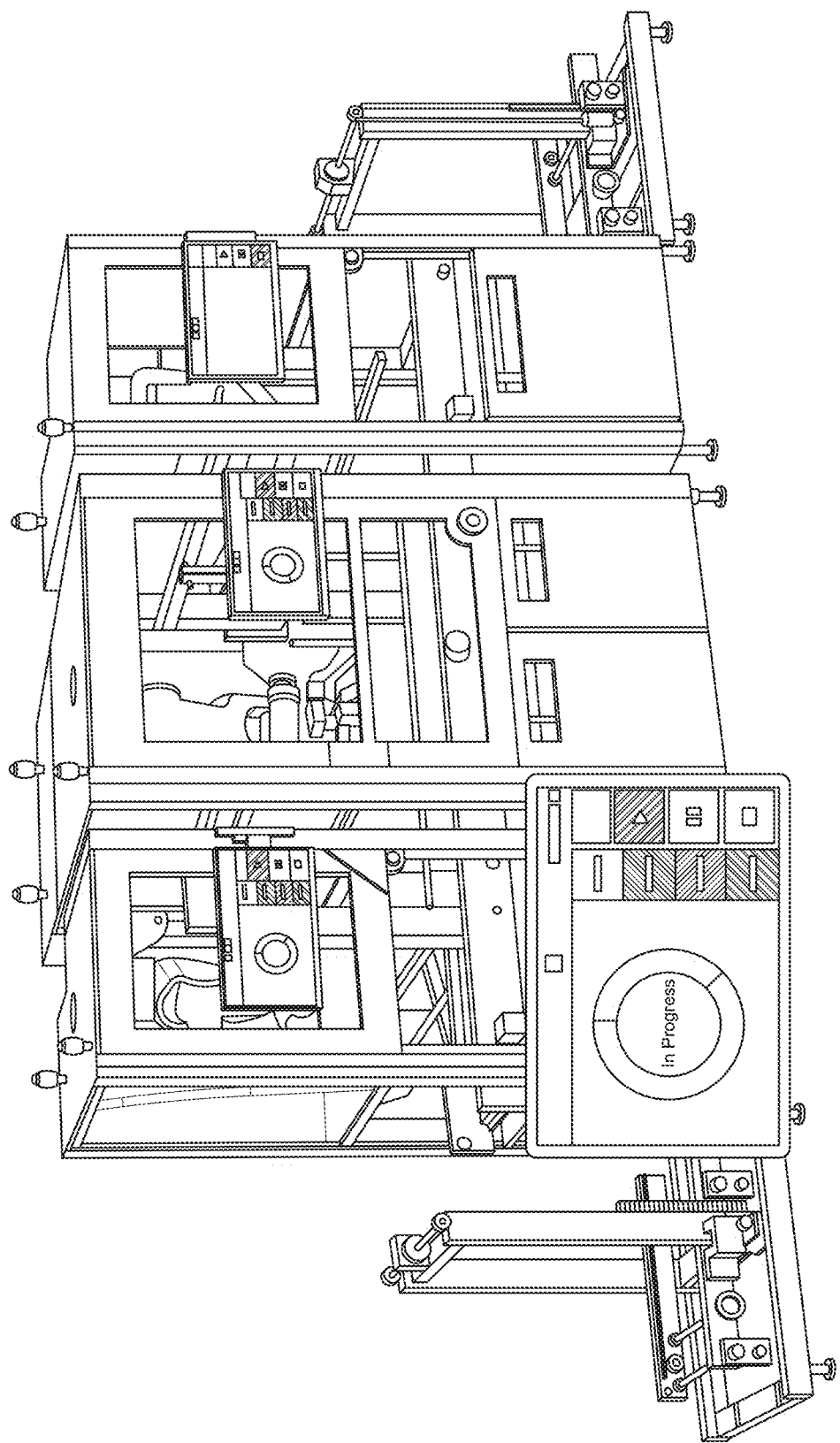
FIG. 1B is an illustration of one embodiment of a micro factory, including a plurality of robotic cells.

FIG. 1B is an illustration of one embodiment of a micro factory, including a plurality of robotic cells. This diagram illustrates three robotic cells, each including a robotic arm, to execute certain actions. As can be seen, a work piece may flow through the three robotic cells, with each robotic cell taking some action(s) in the process.

Figure 1C:
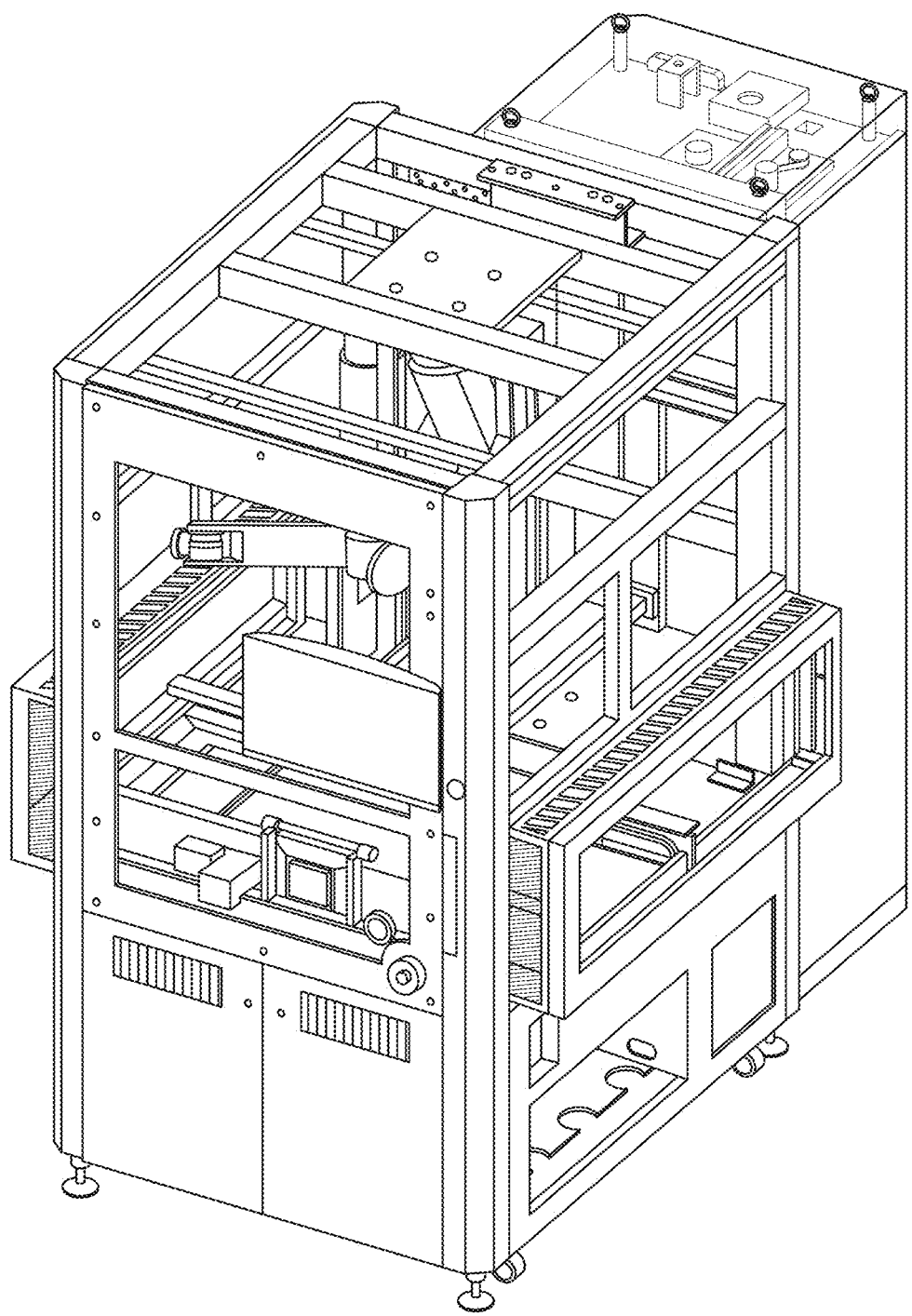
FIG. 1C is an illustration of one embodiment of a robotic cell.

FIG. 1C is an illustration of one embodiment of a robotic cell. The robotic cell includes openings for a conveyor belt, and an associated tray feeder through which work pieces may be provided to the robotic cell. The robot arm can be seen. In one embodiment, the robot arm is a 6-axis arm and has a range of motion through the entirety of the work space. The workspace in one embodiment is defined by the enclosed area, shown in which the robotic arm moves. A holistic view of the workspace encompasses all of the components, work pieces, and other items in the workspace. For a robotic assembly system, the workspace may encompass the robotic arm, the tray feeder, the conveyor belt, and associated work pieces which may be within the robotic cell. The present system is designed to auto-calibrate the elements within this 3D space, to ensure that the processes performed by the robotic cell are accurate, consistent, and repeatable.

Figure 1D:
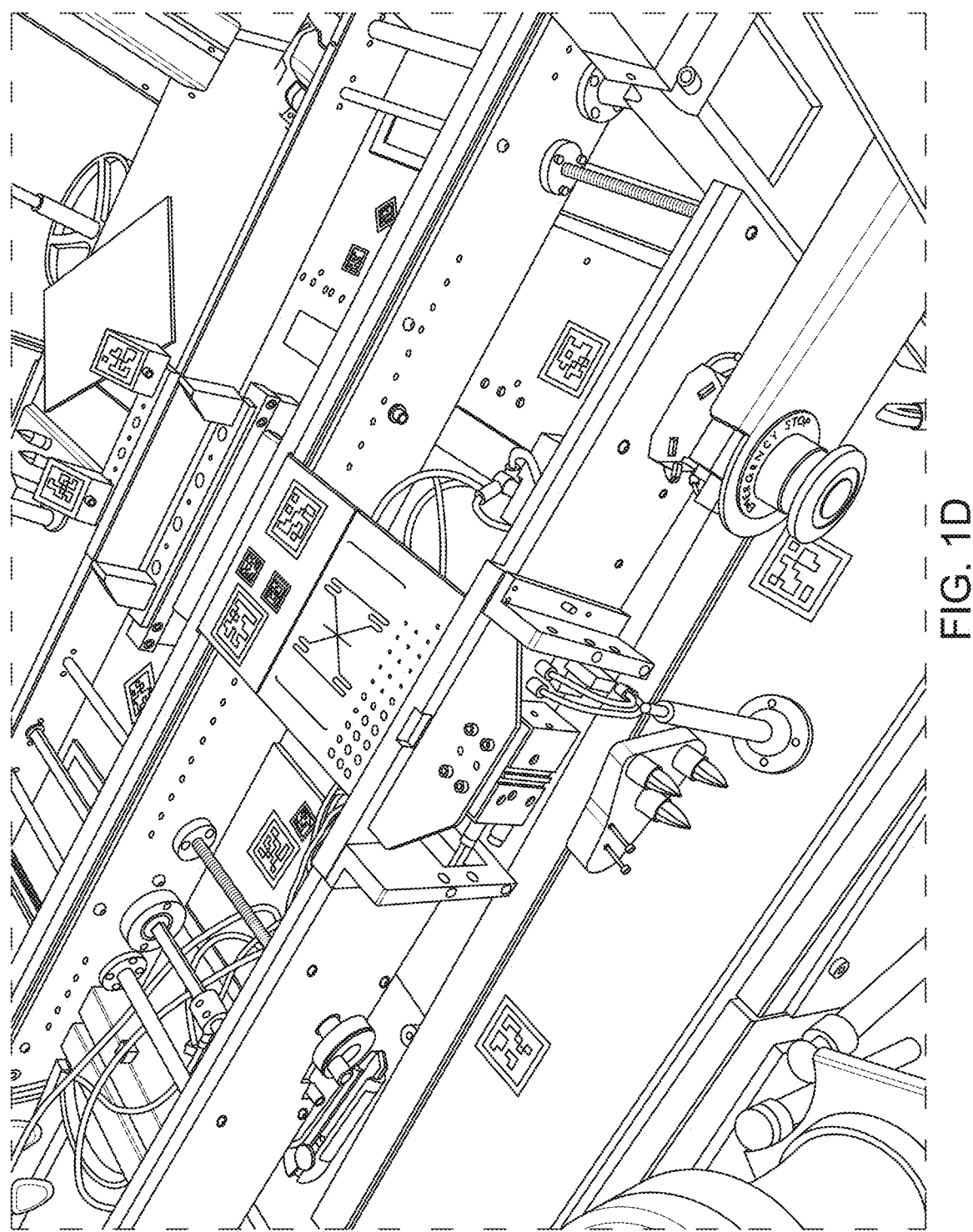
FIG. 1D is an illustration of one embodiment of a portion of a workspace including a plurality of fiducials.

FIG. 1D is an illustration of one embodiment of a portion of a workspace including a plurality of fiducials. In one embodiment, the system includes a plurality of fiducials within the robotic cell. As shown here, the fiducials in one embodiment may be AprilTags. The fiducials and/or other visual features can provide lens calibration, which can be used to localize and calibrate the elements. In one embodiment, the fiducials are used as part of the initial auto-calibration and for the continuous feedback and calibration verification as will be described below. Although AprilTags are illustrated, other types of fiducials may be used, including QR codes, other patterns, or natural or manmade visual features of the robotic cell which can serve as reference points.

Figure 1E:
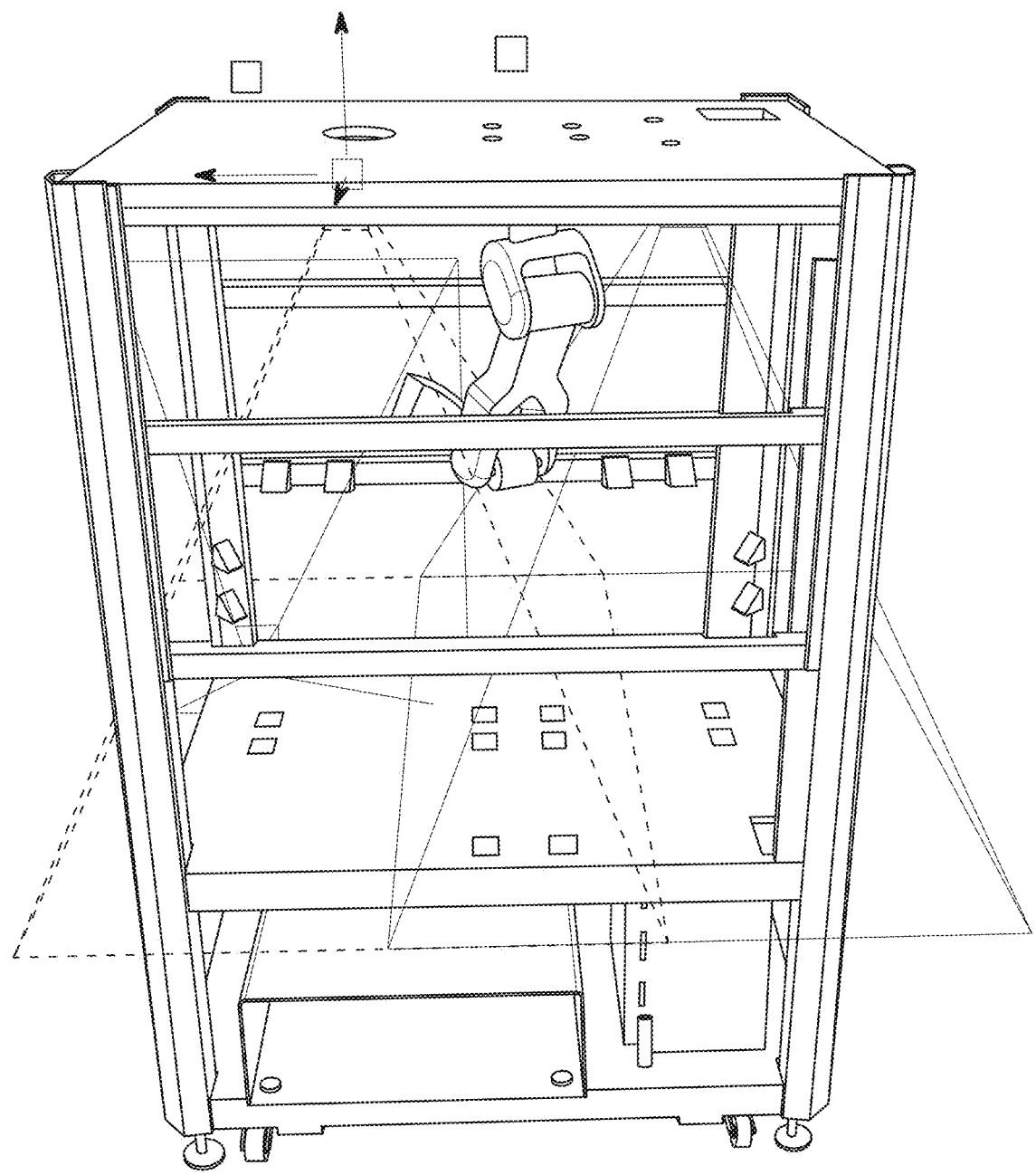
FIG. 1E is a diagram showing one embodiment of the elements of defining a holistic view a workspace.

FIG. 1E is a diagram showing one embodiment of the elements of defining a holistic view of a workspace of the robotic cell. The workspace is defined in one embodiment by a frame and enclosure within which the robotic arm can move to take action on work pieces. In one embodiment, the workspace includes two or more cameras to provide a stereoscopic view, or multi-camera three dimensional view, of the space. In one embodiment, there is an additional camera on a side of the frame. In one embodiment, there is a camera at the end of arm. Additional cameras may also be used. The different cameras with different viewpoints give different benefits.

The two top cameras both cover the entire workspace, in one embodiment. The side camera provides a better view of the end-of-arm, and provides an extra check on positioning. The on-arm camera provides close-up images.

The combination of camera data from the multiple cameras, and optionally sensor data, provides a three-dimensional representation of the workspace. In one embodiment, this enables the system to observe the robotic arm in three dimensions, and creates a representation of the 3D volume that is being monitored. Having the holistic or system level representation enables the system to build up an expectation of where elements are in the workspace, and fully understand the cell configuration and the location of the objects within the workspace. The system can then react if the reality, as detected by the cameras, deviates from the expectation built based on the holistic representation of the workspace. This provides a more accurate system and understanding of the position and actions of the robotic arm. In contrast, prior art systems generally use monocular cameras or multi-camera systems calibrated only to a limited number of 2-dimensional work planes, and flatten the data.

The use of a holistic representation of the 3D volume of the workspace is possible because the autocalibration and continuous feedback and recalibration ensures that the real world positioning and movement of the robotic arm and relevant work pieces is accurately represented in the system. In one embodiment, this virtualized robotic cell, or virtual representation, may be referred to as "digital twin." The digital twin representation may be shown as a visual reflection of the actual robotic cell, in one embodiment. In another embodiment, the digital twin is the holistic representation within the system that is not illustrated visually.

Figure 2:
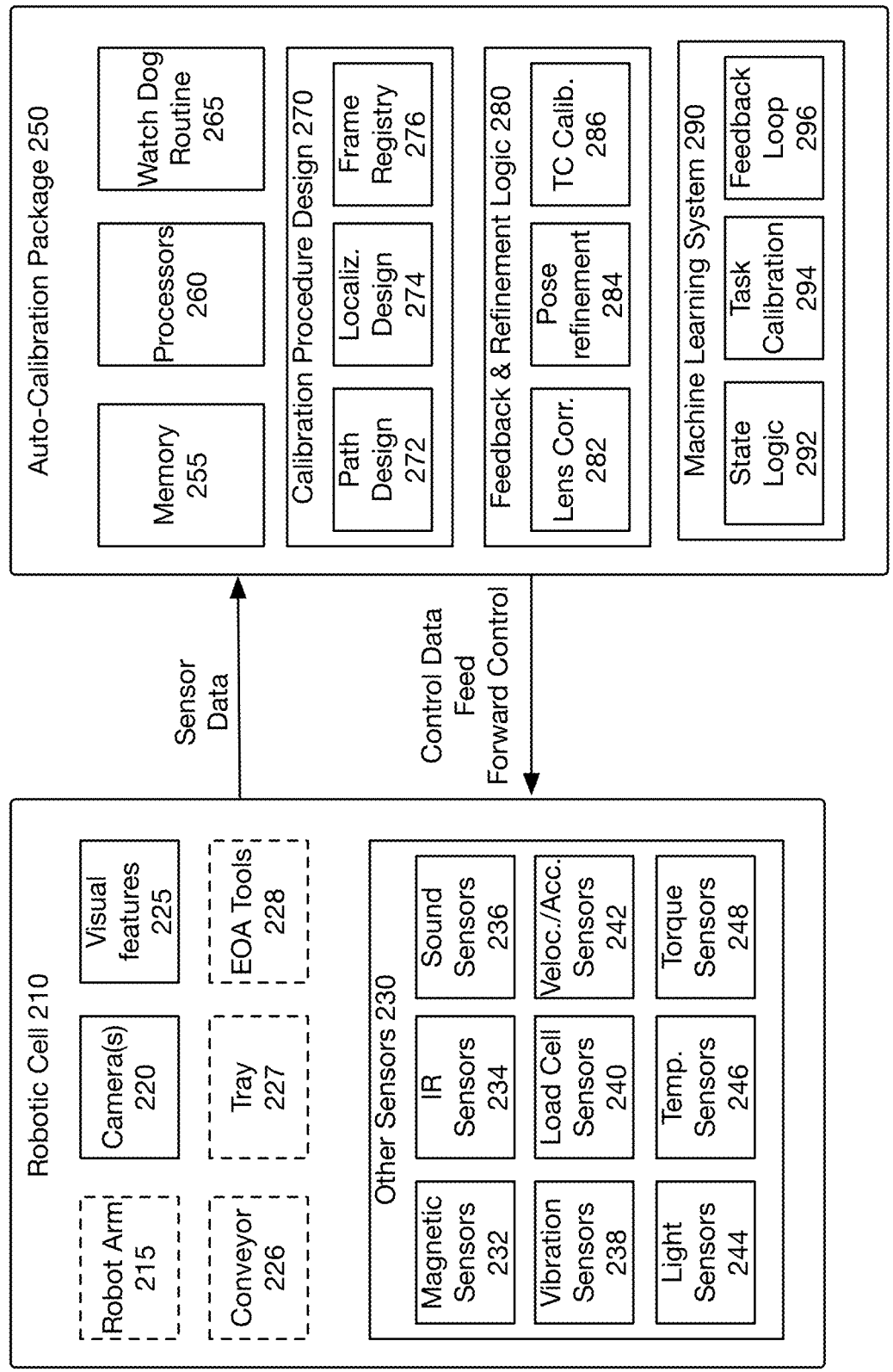
FIG. 2 is a block diagram of one embodiment of the robotic cell and auto-calibration system.

FIG. 2 is a block diagram of one embodiment of the robotic cell and auto-calibration system. The robotic cell 210 includes in one embodiment, a robot arm 215, cameras 220, and fiducials 225. The robotic arm 215 in one embodiment is a six axis robotic arm from any one of a plurality of manufacturers such as FANUC™. In one embodiment, the cameras 220 comprise at least two cameras overseeing the workspace. The fiducials 225 in one embodiment comprise multiple fiducials positioned within the workspace used to calibrate the system, and perform continuous feedback on calibration. In one embodiment, at a minimum the robotic cell 210 includes one camera 220 and fiducials or visual features (natural or man-made) to enable calibration. For example, in an AIO machine, the system includes a camera to autonomously scan the device under test to identify quality defects.

The workspace in one embodiment may include other elements such as the workpiece, and the conveyor belt(s) 226 which move work pieces to and from the robotic cell. Other elements may include a tray 227 on which a workpiece, or other parts to be added to the workpiece are located, and the path from the tray feeder. Other elements may include the end of arm tool 228, and optionally a tool switch if other tools are present. A "tool switch" refers to a special mounting interface on the robotic arm that allows the end-of-arm tool to be changed (either manually or automatically via software control). This enables the auto-calibration routine to calibrate multiple tools. In one embodiment, this also enables the use of a special calibration tool for the robot, enabling the system to calibrate and then re-mount an end-of-arm tool. Other elements in the work space may include safety systems such as light curtains, an electrical system, illumination systems, sensors, cable management systems, and other elements which are within the workspace of the robotic cell, and thus may be considered as part of the robotic cell system.

In one embodiment, the robotic cell 210 further includes one or more other sensors 230. These other sensors 230 may include magnetic sensors 232, infrared sensors 234, sound sensors 236, vibration sensors 238, depth sensor, ultra-violet sensors, laser sensors, pressure sensors, electrical current sensors, temperature sensors, polarization sensors, as well as other sensors. The other sensors 230 may also include load cell sensors 240, which sense the force exerted by the robotic arm. The other sensors 230 may also include velocity and/or acceleration sensors 242 on the robotic arm 215. The other sensors 230 may also include light sensors 244, temperature sensors 246, torque sensors 248, and other sensors. In one embodiment, the temperature sensors 246 may be used to monitor changes in temperature within the robotic cell 210 because changes in temperature impact the dimensions of metal and plastic parts and may require calibration system modeling and adjustments.

The robotic cell 210 includes additional parts, such as network connections, power and signal connections, processors, user interface elements, security systems to shut down the robot, and other parts which are not shown for simplicity.

The robotic cell 210 sends sensor data to the auto-calibrator 250, and receives control data from auto-calibrator 250. In one embodiment, the auto-calibrator 250 may be a processor and subroutines implemented within the chassis of the robotic cell. In another embodiment, the auto-calibrator 250 may be remote from the robotic cell. In one embodiment, some of the systems described are remote, while others are local.

The auto-calibrator 250 in one embodiment is implemented by one or more processors 260 utilizing memory 255. The processes described in one embodiment are software designed for implementation on the hardware of the robotic cell 210, and configuring the actual hardware. In one embodiment watch dog routine 265 provides continuous monitoring of the calibration, after the initial calibration, ensures that the robotic cell remains calibrated, and triggers re-calibration if needed.

In one embodiment, the calibration procedure design 270 includes a path design 272. The path design 272 designs movement patterns for the robotic arm for various actions, and calibrates the movement inaccuracies or discrepancies between the predicted positions in the movement pattern and the measured positions of the robotic arm. Robotic movement is often highly reproducible but not highly accurate. Because the robotic arm has multiple joints and moving parts, designing paths that are observable and accurately calibrated is useful. Calibration procedure design 270 further includes localization design 274 and frame registry 276.

The localization process 274 localizes one or more cameras relative to other features of the cell, such as a robotic arm and/or other elements such as fiducials, fixtures, pallets, parts, feeders, trays, visual features, points of interest, etc. within the robotic cell. In one embodiment, the system uses a virtual origin frame to localize the cameras in space, relative to the robotic cell. In one embodiment, the process then creates a map, including accuracy v. precision curves. The map is continuously updated, in one embodiment. The frame registry provides positional data. In one embodiment, the system provides flexible storage and retrieval of images used to compute positional data.

Feedback and refinement logic 280 provides lens distortion correction 282, pose refinement 284, and tool contact calibration 286.

Machine learning system 290 maintains a state logic 292 of the current state of the robotic arm, and the holistic definition of the workspace. Task calibration 294 provides an adjustment to a task (a series of actions to accomplish a goal), based on the calibration. In one embodiment, feedback loop 296 utilizes the continuous feedback from the robotic cell 210 and auto-calibrator 250 while the robotic cell is in use, to refine and maintain the holistic definition of the workspace.

The simplified elements shown are integrated into a robotic cell with additional CPUs, GPUs, user interface elements, and network connections. While the auto-calibration package 250 is illustrated as separate logics, one of skill in the art would understand that the auto-calibration package 250 may be integrated into a processor or set of processors. These devices may be local to the robotic cell 210, or may be remote. In one embodiment, some of the processes described may be utilized off-site, or in the cloud, and processed data may be returned to the robotic cell 210.

Figure 3:
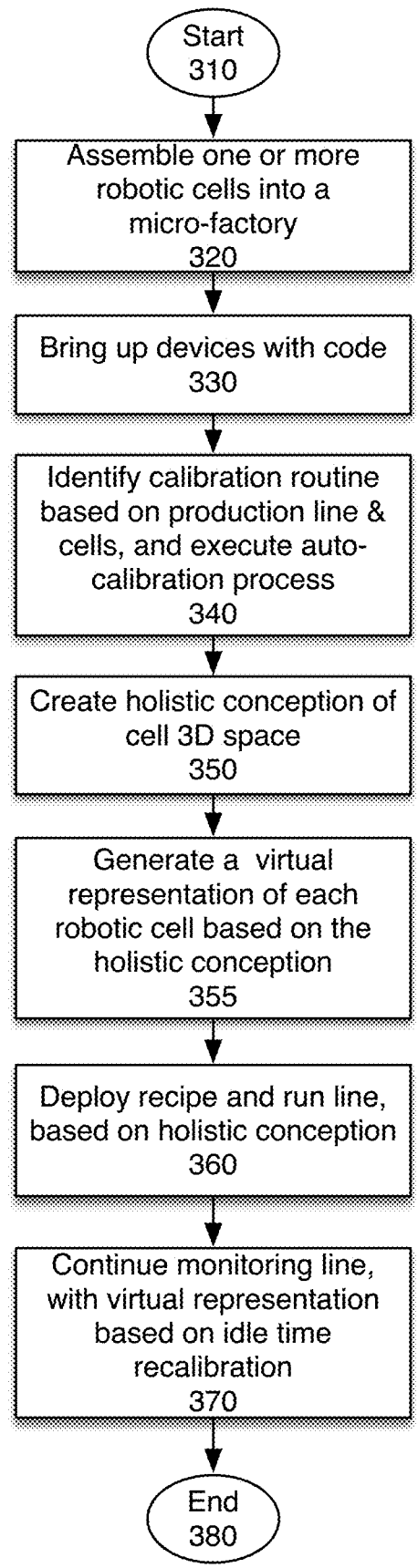
FIG. 3 is an overview flowchart of one embodiment of auto-calibration.

FIG. 3 is an overview flowchart of one embodiment of auto-calibration. The process starts at block 310. At block 320, one or more robotic cells are assembled into a micro factory. As noted above, the micro factory may manufacture, assemble, inspect, verify, test, or otherwise be involved in the manufacturing process. The micro factory may be a portion of a larger system which does not utilize robotic cells, or may provide a self-contained manufacturing system.

At block 330, the devices are initialized with code. In one embodiment, the initialization of the device identifies each of the elements within the robotic cell, including the robotic arm, the tool being used, the cameras, etc. The device initialization loads the basic sequence of steps that the robotic cell will perform.

At block 340, the calibration routine is identified for the cell. In one embodiment, the calibration routine is based on the production line and cell configuration. For example, for a robotic cell that does pick-and-place, the calibration routine may be different than for a robotic cell that tightens a screw, because the range of motion and the path taken by the robotic arm and the work pieces is different. The auto-calibration process is executed.

At block 350, based on the data from the calibration process the system creates a holistic conception of the robotic cell's workspace, including the robotic arm, end-of-arm tool, work pieces within the workspace, etc. The holistic conception is used to set expectations for the movements and commands.

At block 355, a virtual representation of the robotic cells is created, based on the holistic conception. The virtual representation of the cell is designed to be closely aligned to the actual cell so that the mapped actions are performed similarly. This enables the system to build expectations for the position and movement pattern of the robotic arm, as well as the other elements within the workspace. The system utilizes this expectation to validate the operation of the cell.

At block 360, a recipe is deployed and the line is run. A recipe in one embodiment is the sequence of commands sent to a robotic cell to execute one or more actions. A recipe may be static or dynamic, simple, or complex. A simple static recipe may be "move conveyor at time X by Y inches." A complex recipe may include obtaining data from a camera, and conditionally inserting a screw, if a part is configured correctly.

A recipe may include an entire assembly process, or a step in a process. As the recipe is run, an expectation of position and movement based on the holistic representation is used to check the accuracy of the process. If any discrepancy is identified it can therefore be immediately addressed.

At block 370, the system continues to monitor the line during the process. In one embodiment, the system utilizes the virtual representation to reflect the expected positions of the elements, and compare those expectations to the observed reality from the cameras. To be able to implement this, the system must maintain accurate calibration. The system in one embodiment uses idle time recalibration to continuously recalibrate the robotic cell, and update the holistic representation and thus expectation based on real-world data. The process ends at block 380.

Figure 4:
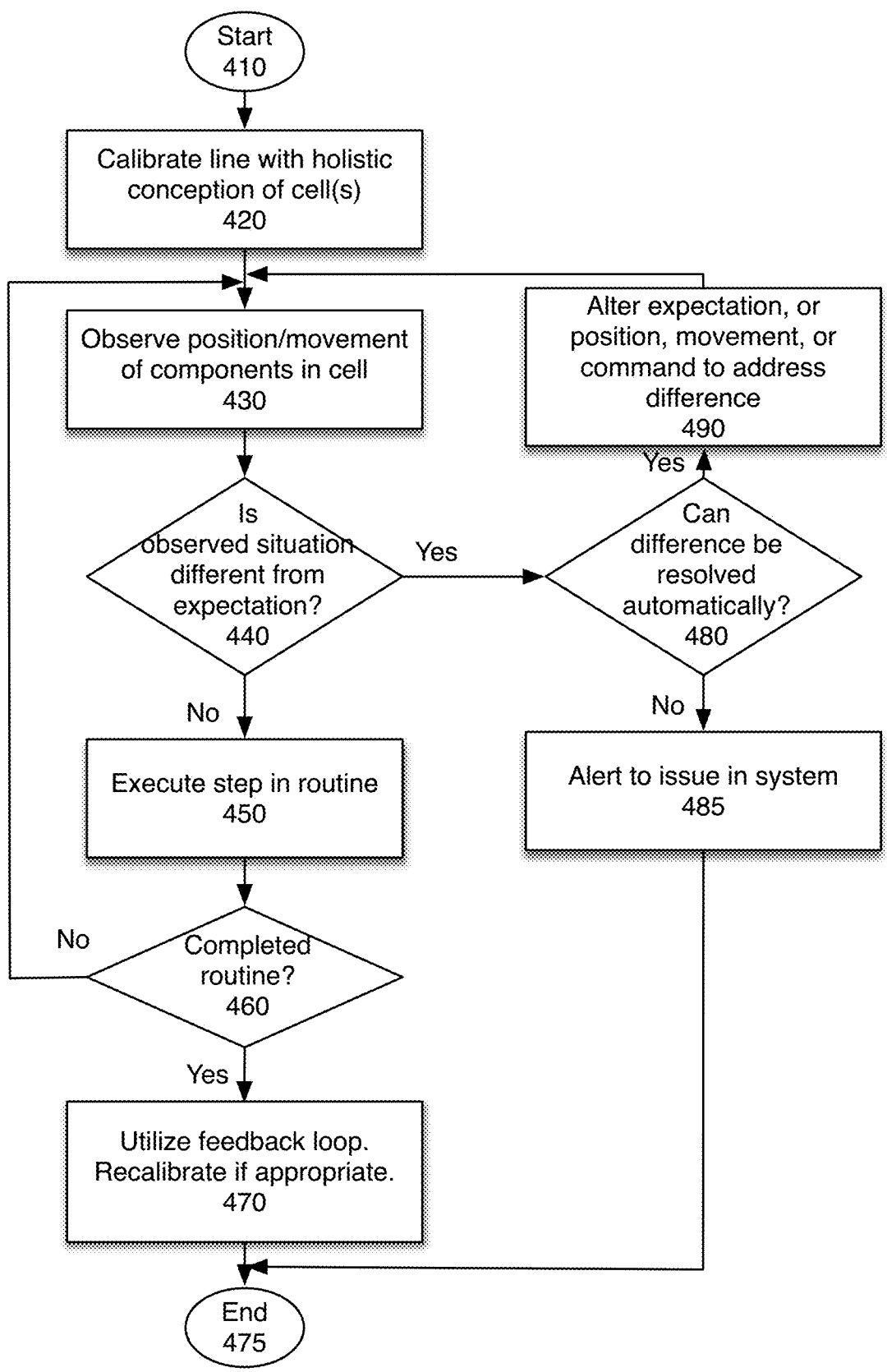
FIG. 4 is an overview flowchart of one embodiment of the holistic representation approach to calibration and use.

FIG. 4 is an overview flowchart of one embodiment of the system level, or holistic representation, approach to calibration and use. The process starts at block 410.

At block 420, the micro factory line is calibrated, with the system having a holistic conception of each robotic cell. The holistic conception encompasses the robotic cell as a system, including all cameras, sensors, the robotic arm, other components, including the work pieces within the work area of the robotic cell. This initial, or off-line calibration, provides the initial parameters for the robotic cell.

At block 430, the position and movement of components within the cell are observed. This is done initially as part of the auto-calibration, and subsequently as the robotic cell is used.

At block 440, the process determines whether the observed real-world situation is different from the expectation based on the holistic conception of the robotic cell, that is whether there are discrepancies in the robotic arm position between the predicted position and the observed position. In one embodiment, the system compares the real world pose and movement pattern (ex. approach vector for each joint) of the robotic arm, tool, and/or work piece to the expectation based on the holistic 3D conception of the robotic system. If the discrepancy is within an acceptable threshold, the current step in the process is executed, at block 450. At block 460, the process determines whether the routine has been completed. If not, the process returns to block 430 and continues observing the position/movement of components. Note that while this is illustrated as a flowchart in the real world the monitoring is continuous, and in one embodiment an interrupt is triggered when a difference is detected between the expectation and the reality.

Once the routine is completed, in one embodiment, at block 470 a feedback loop is used to provide feedback to the system. The feedback loop provides data to the expectation and machine learning systems. The system may also recalibrate, if appropriate. In one embodiment, the system may utilize continuous micro-recalibrations, to keep the holistic conception completely aligned with the system. The process then ends, at block 475.

If at block 460 the system determined that the routine has not yet been completed, the process returns to block 430 to continue observing components in the cell.

If, at block 440, the system determined that there was a difference between the observed situation and the expectation based on the holistic conception, that is that there is a discrepancy between the observed movement and the predicted position, the process continues to block 480. At block 480, the process determines whether the difference can be resolved automatically. A difference can be resolved automatically when the discrepancy can be resolved with additional data or with an adjustment of either the expectation or the real-world system. If the system can resolve the issue automatically in one embodiment, at block 490 the system alters the expectation or the real-world to match them. The process then returns to block 430 to continue the process. In one embodiment, modifying the expectation includes performing a micro-auto-calibration, or online calibration. If the difference cannot be resolved, the system uses an alert and stops the process at block 485. In one embodiment, the user may resolve the discrepancy or reset the system, or auto-calibrate the system to realign the holistic conception and expectation with the real world. The process then ends.

Figure 5:
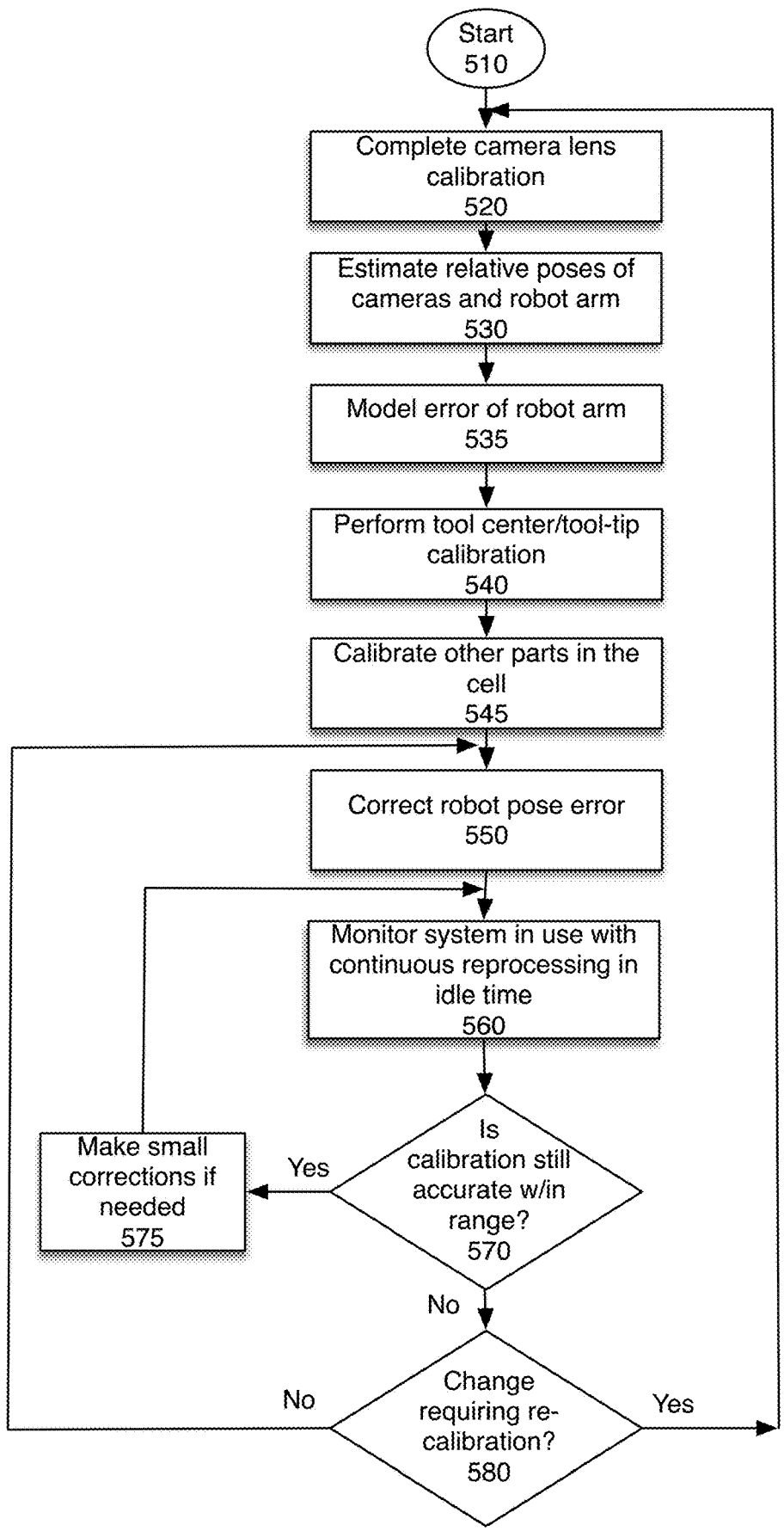
FIG. 5 is an overview flowchart of one embodiment of in-use recalibration.

FIG. 5 is an overview flowchart of one embodiment of auto-calibration. The process starts at block 510. At block 520, camera and lens calibration is performed. In one embodiment, there is at least one camera which is attached to the robotic cell. In one embodiment, the camera is attached to the reference, the most rigid portion of the robotic cell. In one embodiment, this is the exterior metal frame, which is the least susceptible to deformations, such as bending or altering position with respect to the rest of the robotic cell. In another embodiment, the camera may be attached to a different portion of the robotic cell.

Camera and lens calibration, in one embodiment, includes utilizing an object with a known pattern moving around the work area. In one embodiment, the pattern is known with known visual features, so that the system can compare what is seen against the known actual pattern properties. The difference is error against "ground truth". The pattern may be a naturally occurring pattern such as wood grain, or a manmade pattern such as a checkerboard, or a fiducial. In another embodiment, instead of moving an object, the system may use a stationary object and moveable cameras, or a pattern covering a large portion of the camera fields of view to calibrate from.

Lens calibration in one embodiment includes adjusting for lens distortion. In one embodiment, each of the cameras and lenses is calibrated. In one embodiment, camera and lens calibration also includes calibrating other sensor technologies. In one embodiment, camera calibration utilizes fiducials in the volumetric layout of the robotic cell work area.

At block 530, the relative poses of the cameras and robot arm are estimated. In one embodiment, relative poses are relative to an origin point. In one embodiment, establishing the relative positions of everything within the workspace with respect to the origin point is referred to as frame registration. In one embodiment, everything is registered with respect to a virtual coordinate system. In one embodiment, every element is registered to a single virtual coordinate system, or "origin" or "root." In one embodiment, the root is selected to be in part of the most rigid part of the robotic cell. In one embodiment, this is the metal frame around the workspace.

At block 535, the robot arm error is modeled. The error represents the offset or discrepancy between a programmed pose and the actual pose of the robot arm.

At block 540, tool tip calibration is performed. Tool tip calibration determines the position of the tool tip—the end of arm tool of the robotic arm. Tool tip calibration is necessary to validate the current position of the robotic arm, and for all commands, since that is the portion of the robotic arm that interacts with work pieces. In one embodiment, each of the portions of the robotic arm may also be calibrated.

At block 545, the other parts of the robotic cell are calibrated to the root and/or to each other. The parts of the robotic cell may include the workpiece, tray, conveyor belt, and any other elements within the workspace. The calibration in one embodiment accounts for every element within the workspace.

At block 550, robot pose error correction is applied. Robotic pose error is the shifting of positioning of robot due to motion, load, deformation, temperature changes, or other changes in the robotic arm, workspace, or environment, which causes a discrepancy between the actual position and the predicted position of the robotic arm. When a robotic arm is sent a command to go to position X, Y, Z (or full multi-joint orientation and pose), the actual position (or pose) that the robotic arm goes to will differ (ex. X', Y', Z'), because movement is not perfectly accurate. The system compensates for this discrepancy. The kinematic engine which determines how to move the robotic arm cannot be perfectly accurate. However, by observing the robotic arm, in the 3D workspace, in real time the system can calculate the offset, or inaccuracy, of the movement compared to the intended destination. This may be used to adjust the instructions to the arm, to increase accuracy.

At block 560, the system is monitored while in use. In one embodiment, the holistic representation is used as a comparison to the observed position data for such monitoring. In one embodiment, data is reprocessed in idle time to perform mini-auto-calibrations during use. In one embodiment, the visual features (fiducials or natural or manmade features) are extracted periodically, to provide continuous monitoring. The system accounts for "breathing" or other sources of inaccuracy such as changes based on temperature, mechanical backlash, hysteresis, deflection, and loading of the robotic arm.

At block 570, the process determines whether the calibration state is still sufficiently accurate. If so, any small corrections are made at block 575 and the system returns to block 560 to continue monitoring.

If the calibration state is no longer sufficiently accurate, at block 580 the process determines whether a complete recalibration is needed. If not, the process continues to block 550 to perform robot pose error compensation calculations. Otherwise, the process returns to block 520 to restart the full auto-calibration process. In this way, the system continuously monitors the system, and ensures that the system remains in a calibrated state, and continuously adjusts as necessary. Note that although this and other figures are shown as flowcharts, in one embodiment, these may be interrupt driven processes. That is, the system may continuously monitor and determine when small adjustments are needed and automatically make those small adjustments. The system's continuous monitoring may trigger a re-calculation or complete re-calibration when the continuous monitoring indicates an issue.

Figure 6:
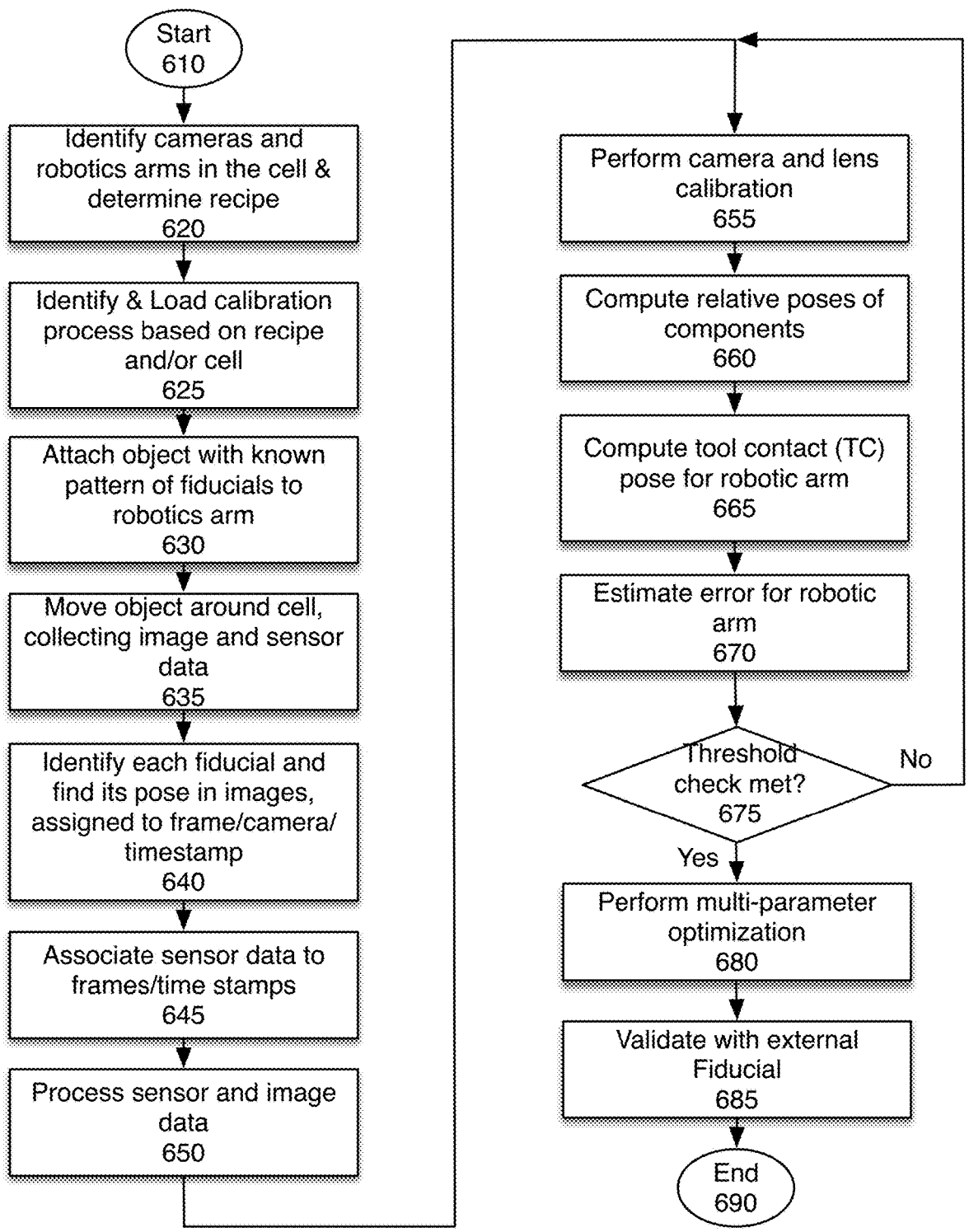
FIG. 6 is a flowchart of one embodiment of an initial calibration process.

FIG. 6 is a flowchart of one embodiment of an initial calibration process. The process starts at block 610. At block 620, cameras and robotics elements in the cell are identified. In one embodiment, the present system can work with off-the shelf parts for cameras, robotic arms, trays, parts, feeders, tools, etc. Because the auto-calibration process brings the parts together into a holistic system, the various parts can be integrated regardless of the manufacturer.

At block 625, the calibration process is identified for the cell. In one embodiment, the calibration process depends on the current configuration and/or use case for the robotic cell, the positioning of the cameras and other sensors, and the particular kind of robotic arm. For example, a robotic cell such as an AOI machine may need a less involved calibration process than an assembly cell utilizing a 6-axis robotic arm.

At block 630, an element with a known pattern of fiducials or visual features is attached to the end of arm. In one embodiment, the element is a checkerboard. In another embodiment, the element may be a dodecahedron, icosahedron, or other multi-planar shape with fiducials one or more of the face providing cameras with a view of multiple fiducials on different planes to improve accuracy (and optionally providing the error minimization framework with additional planarity constraints). In another embodiment, the element attached to the end of arm may have an undefined pattern of features, such as wood grain, scratches/stains/uneven finish, which are seen from multiple points of view from multiple cameras, where the visual features are matched and triangulated.

At block 635, the element is moved around the cell, and image and sensor data is collected. In one embodiment, the pattern of movement may depend on the recipe/process which will be implemented by the robotic cell. In one embodiment, the movement ensures that all cameras and sensors can receive data from the element.

At block 640, each fiducial is identified, and its pose is identified. In one embodiment, a frame/camera/timestamp association is used at block 645. The sensor and image data is processed at block 650, to perform camera and lens calibration 655. The lens calibration corrects for lens distortion. By observing the movement of an object around the cell, the distortion can be corrected for differences in various regions of the robotic cell, and differences between cameras.

At block 660, the relative poses of the other components are computed. These components include the robot arm, and other elements within the workspace.

At block 665, the tool contact pose is calculated for the robotic arm. Registering the tool contact point is used for executing most recipes, since that is the portion of the robotic system which generally interacts with the work pieces.

At block 670, the system computes an estimated pose error for the robotic arm. In one embodiment, the error is dependent on the movement, orientation, load, and speed of the robotic arm. Because the arm consists of multiple jointed parts, any end pose of the robotic arm may be arrived at through an infinite number of approaches. Therefore, calculating the error based on orientation, load, and approach movement is necessary to ensure that the system correctly represents the real world position of the robotic arm in the holistic representation. For example, this approach can correct for mechanical hysteresis and backlash from a variety of approach vectors.

At block 675, the process determines whether the elements are sufficiently accurate to meet an accuracy threshold. In one embodiment, the system may refine the calibrations multiple times. In one embodiment, the system may provide an initial calibration, and then test whether the quality thresholds are met, and refine as necessary. The test whether the calibration, pose estimates, and errors are within the parameters may be performed after any of the steps above, as well as here.

Once the calibrations are sufficiently refined, at block 680 multi-parameter optimization is performed in one embodiment.

At block 685, in one embodiment, the system is validated with an external fiducial. In one embodiment, that involves utilizing one or more separate fiducials or natural visual features to verify that each camera lens, camera pose, and tool contact point calibration are all accurate, and the error model accounts for inaccuracies. The process then ends at block 690.

Figure 7:
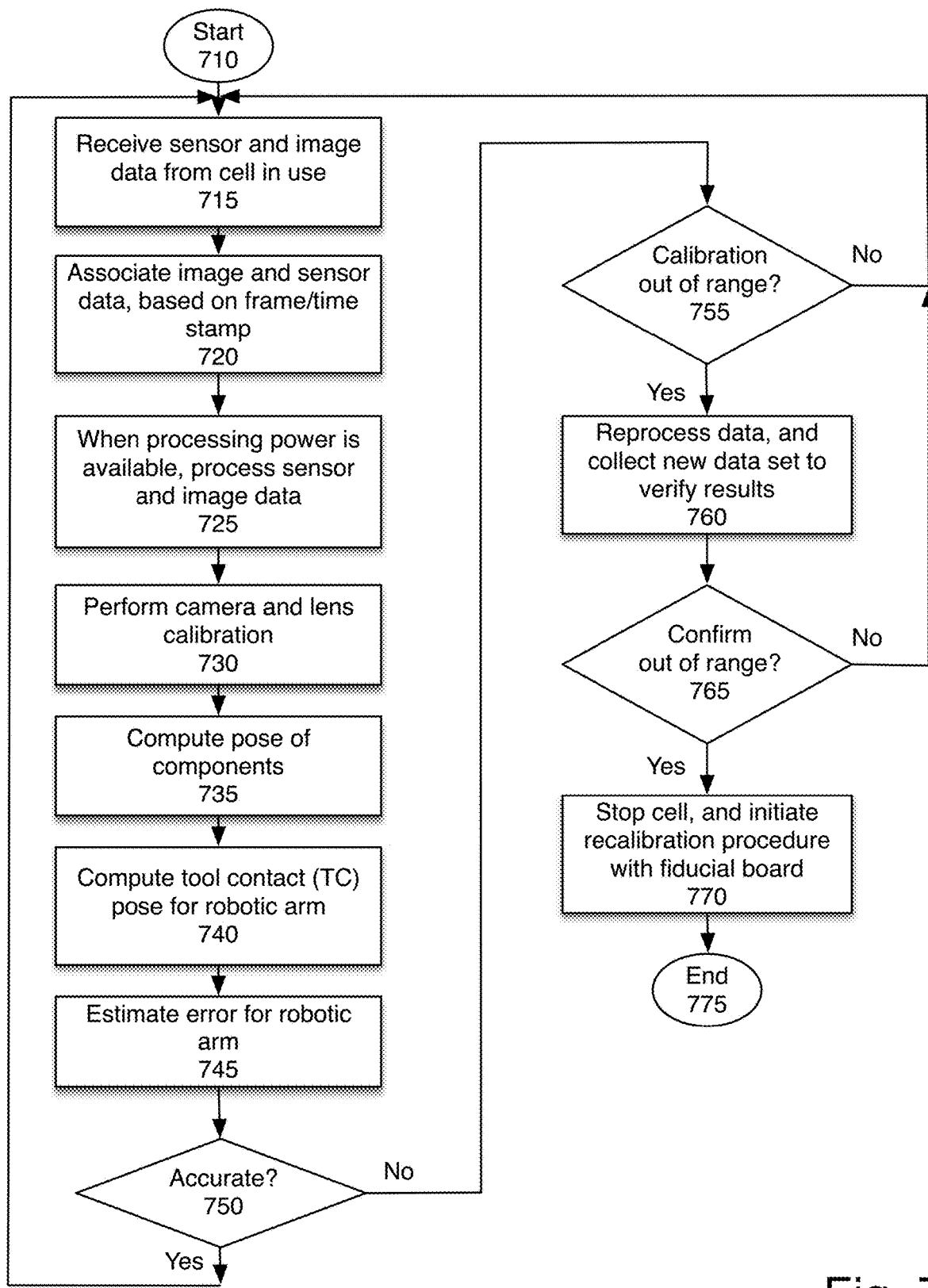
FIG. 7 is a flowchart of one embodiment of in-use reprocessing and calibration.

FIG. 7 is a flowchart of one embodiment of in-use reprocessing and calibration. The process starts at block 710.

At block 715, the system receives sensor and image data from a cell in use. In one embodiment, this sensor and image data is continuously received.

At block 720, the sensor and image data are associated with each other based on frame/time stamp.

At block 725, when processing power is available, the sensor and image data are processed. In one embodiment, this occurs in idle cycles of the processor, so that the reprocessing does not impact the manufacturing process flow.

At block 730, the camera and lens calibration is performed.

At block 735, the pose of each of the components in the workspace is computed.

At block 740, the tool contact point is computed for the robotic arm. As noted above, the tool contact point may be a tool center point (TCP), one or more line segments, or planes, with which the tool contacts a workpiece, or some other reference with a known relative pose to the pose of interest.

At block 745, the error model for the robotic arm is estimate.

The process at block 750 determines whether the holistic representation of the workspace, robotic arm, and tool contact point is sufficiently accurate, based on the real-world data compared to the expectation from the holistic representation. If the representation is accurate, the process continues to monitor, at block 715.

If the representation is inaccurate, the process determines whether the calibration is out of range, at block 755. If not, the process continues to block 715. Otherwise, the data is reprocessed, and new data is collected to verify results, at block 760.

If the additional data also indicates that the system is out of range at block 765, the cell is stopped, and a full recalibration procedure is initiated at block 770. Otherwise, the process returns to block 715. In one embodiment, the system may initialize a mini-auto-recalibration when calibration is in range, but insufficiently accurate, but a full auto-calibration process is initiated when the system is confirmed to be out of range. The process then ends at block 775.

Figure 8:
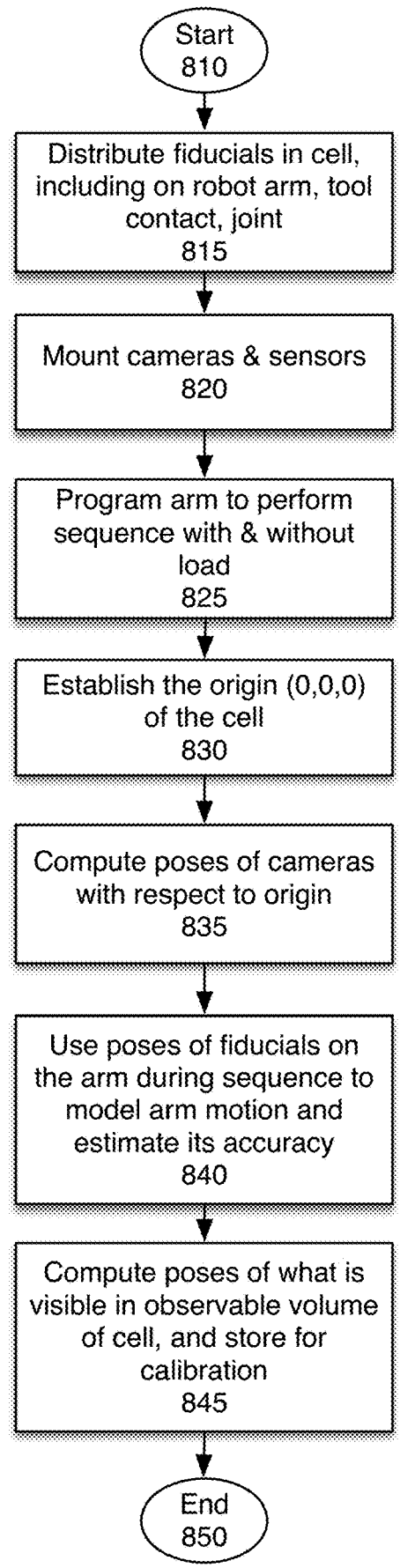
FIG. 8 is a flowchart of one embodiment of setting up a robotic cell, with sensors and calibration.

FIG. 8 is a flowchart of one embodiment of setting up a robotic cell, with sensors and calibration. The process starts at block 810.

At block 815, fiducials are distributed in the cell. In one embodiment, fiducials are placed on flat and angled surfaces on the cell. In one embodiment, fiducials are also positioned on the robotic arm. In one embodiment, each jointed portion of the robotic arm may have a fiducial.

At block 820, cameras and sensors are mounted. In one embodiment, the cameras are mounted on the most rigid portion of the robotic cell, such as the metal frame. However, even the metal frame shifts and deforms over time. In one embodiment, at least two cameras are mounted on top of the cell, overseeing the workspace. This enables the integration of the data from the cameras to provide a stereoscopic view of the work area. In one embodiment, a side camera is used to ensure a view of the tool tip. A tool tip camera may be used for close-up images of a work piece. In one embodiment, the cameras are positioned such that each camera sees at least two fiducials or visual features for calibration. In one embodiment, each camera sees at least three fiducials or visual features, where at least one of the fiducials or visual features is oriented on an element that is not parallel to the other elements.

At block 825, the robotic arm is programmed to perform a sequence of movements. In one embodiment, the sequence of movements may be performed with and without a load. A load, in this context, is something that is gripped by the robotic arm, or a tool attached to the robotic arm. In one embodiment, if the robotic arm would have multiple types of tools in the recipe, the sequence of movements may be performed with each of the loads that will be attached to the robotic arm during the process.

At block 830, the origin (root, or virtual 0,0,0 position) is established for the cell. In one embodiment, this root is selected with respect to the most rigid part of the cell. In one embodiment, the root is selected so at least two cameras can see the position. In one embodiment, the root is defined based on a fiducial. In one embodiment, the root is defined by calculating the average of the centers of four fiducials, arranged in a square.

At block 835, the exact poses of the cameras and sensors are computed, with respect to the origin.

At block 840, the uses poses of the fiducials on the arm during a movement sequence to model arm motion, and estimate its accuracy. In one embodiment, the system tracks of fiducials on the robotic arm during the movement sequence to establish arm accuracy & create arm behavioral model. Because the system performs movements with and without load, the behavioral model accounts for load. In one embodiment, the behavioral model also accounts for differences in robotic arm accuracy based on relative movement and position, as well as load.

At block 845, the system computes the position and orientation of the elements visible in the observable volume of the cell (e.g., the work area, which can be observed by at least two cameras), and that data is stored for calibration. In one embodiment, this includes all of the elements within the workspace, including conveyors, work pieces, etc. The process then ends at block 850.

Figure 9:
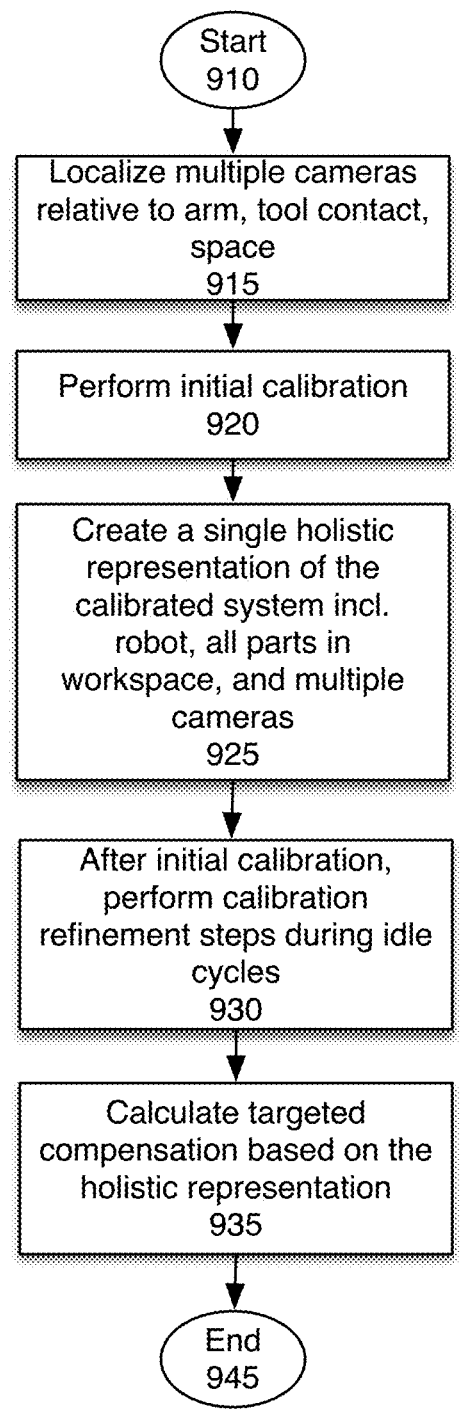
FIG. 9 is an overview flowchart of one embodiment of setting up the workspace.

FIG. 9 is an overview flowchart of one embodiment of setting up the workspace. The process starts at block 910.

At block 915, the multiple cameras are localized. Localization in one embodiment determines the relative position of the arm, tool contact, and other cameras, with respect to the shared root.

At block 920, the initial calibration is performed. In one embodiment, the process described above is used for this step.

At block 925, a single holistic representation of the calibrated system is created, including the robot, cameras, sensors, tool tip, and other parts which are involved. In one embodiment, the holistic representation includes work pieces within the robotic cell, as well as the tray puller and conveyor belt which are used to bring in work pieces and remove work pieces. The holistic representation provides the ability to predict the movement of the robot, and compare that prediction or expectation, with the real world to confirm accuracy.

At block 930, after the initial calibration, the system performs calibration refinement steps during idle cycles. This ensures that robot pose error over time, which may be the result of changes in temperature, drift due to movement, etc. are accounted for in the holistic representation and thus expectation.

At block 935, the targeted compensation to account for errors is calculated, based on the holistic representation of the workspace as noted above when a robot is instructed to move to position X, Y, Z, it will move to position X', Y', and Z' because of inaccuracy in movement and the interplay of the various joints and parts. The compensation adjusts the instruction so that when the system needs the robot to move to position X, Y, Z, it will instruct the robot to move to position X", Y", Z", which will result in the robot moving to position X, Y, Z. The process ends at block 945.

Figure 10:
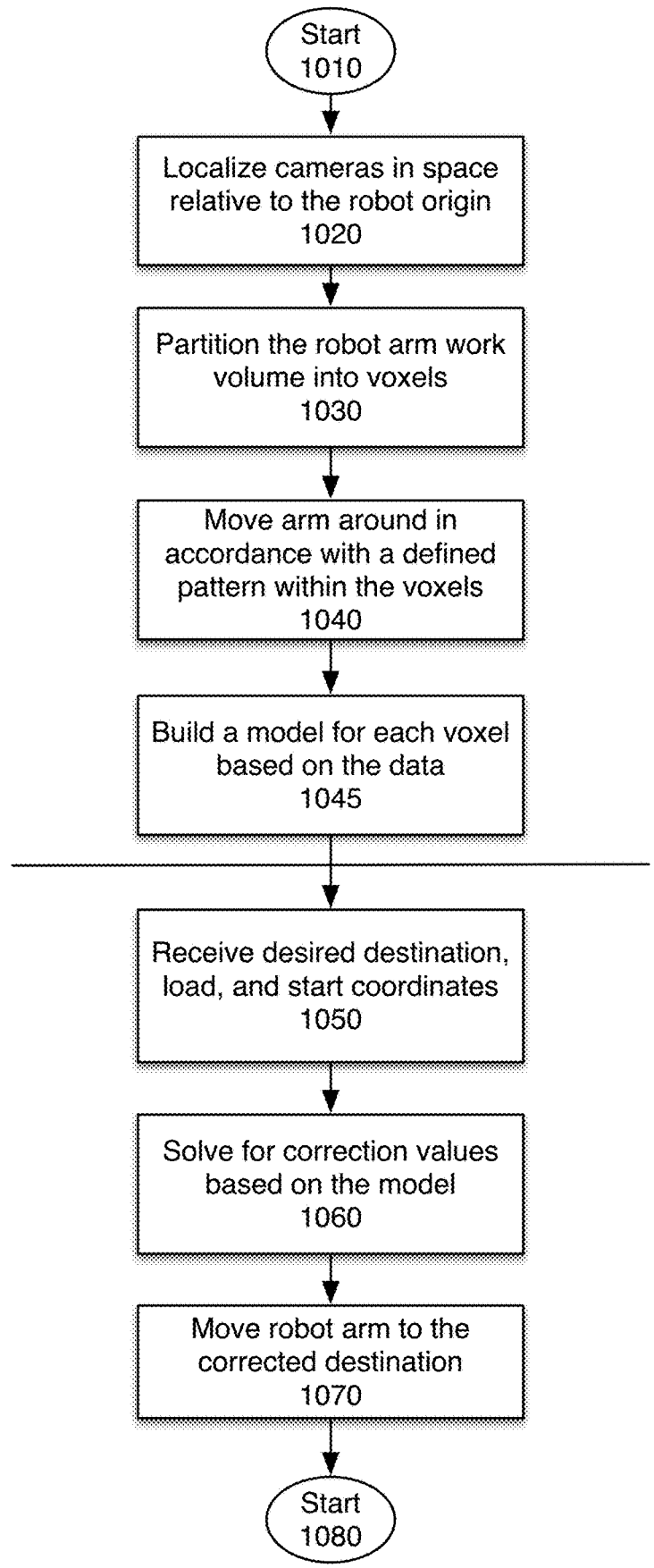
FIG. 10 is a flowchart of one embodiment of error minimization.

FIG. 10 is a flowchart of one embodiment of error minimization. The process starts at block 1010.

At block 1020, the cameras are localized in space relative to the origin. In one embodiment, the origin is positioned on the most rigid portion of the robotic cell frame and the robot. In one embodiment, the cameras are localized with respect to the virtual root (0,0,0) and then localized relative to the robot and the frame.

At block 1030, the work volume, or work space is partitioned into voxels. In one embodiment, the voxels may be the same size across the work space. In another embodiment, the voxels may be different sizes, based on the need for accuracy in various portions of the workspace, because the system models the robot arm accuracy for each voxel.

At block 1040, the robot arm is moved around within the voxels, in a predefined pattern. In one embodiment, the robot arm approaches the center of each voxel from a variety of different approach angles, and with a variety of different weights. This enables the modeling of the robot arm errors.

At block 1045, a model is built for each voxel based on the data. The model reflects the accuracy and precision of the robotic arm within that voxel, based on the angle of approach and the weight. The robotic arm's accuracy depends on the position of the robotic arm, e.g., in one embodiment the robotic arm's positioning may be more accurate when near the center of the work area, and less accurate toward the edges of the work area, as the joints are extended. This model can then be stored and used when robot instructions are received. Blocks 1050 through 1070 represent the use of the model.

At block 1050, the desired destination coordinates for a movement are received. The system obtains the start coordinates, e.g., the current position of the robotic arm. In one embodiment, load data is also provided.

At block 1060, the system solves for the correction values to be applied to the movement, based on the model described above. The model is based on the angle of approach, weight, and end position of the robot arm for the movement.

At block 1070, the robot arm is moved to the corrected destination, to perform the action.

The process ends at block 1080.

Figure 11:
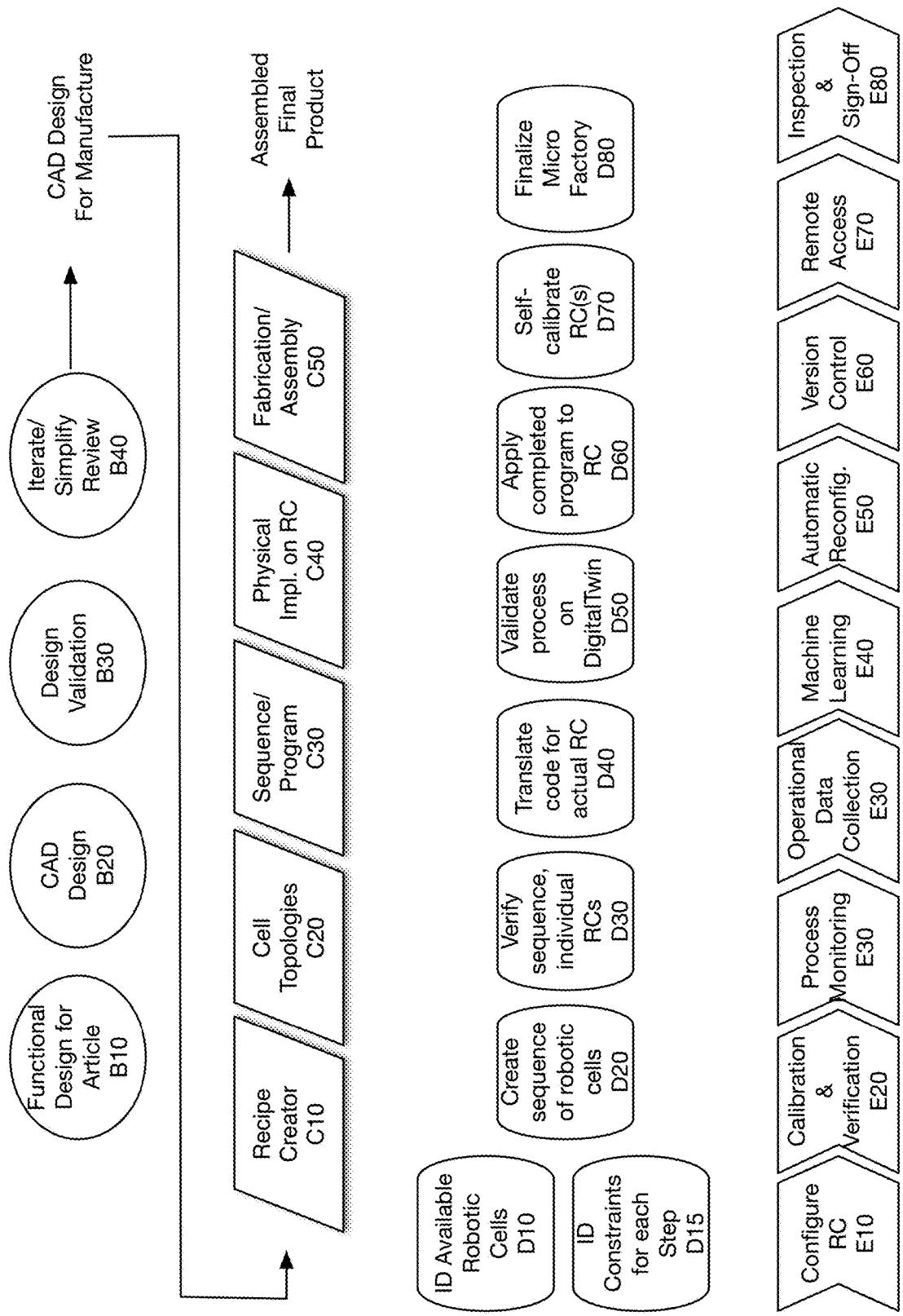
FIG. 11 is a process flow illustrating one embodiment of setting up and using a robotic cell.

FIG. 11 is a simplified block diagram of the process which utilizes the micro factory comprising one or more robotic cells to create assembled final products. In some embodiments, the robotic cells may be inserted into a traditional manufacturing line, to take over some sub-portions of the manufacturing. The process includes the layers of manufacturing, from recipe creation via recipe creator C10 to fabrication/assembly via micro factory C50. Although a complete process is shown, from initial concept/functional design through completed manufacturing, one of skill in the art would understand that the system may implement a subset of these processes and include a subset of these features.

Of course, though various processes are illustrated in flowchart form, one of skill in the art would understand that the illustration as a flowchart does not require each of the process elements to occur in a particular order. Additionally various aspects may be interrupt driven, rather than looping. Furthermore, any processes which are not dependent on data from the prior elements of the flowchart or which does not have later elements dependent on it, may be rearranged to occur earlier, later, or in parallel with other processes.

Figure 12:
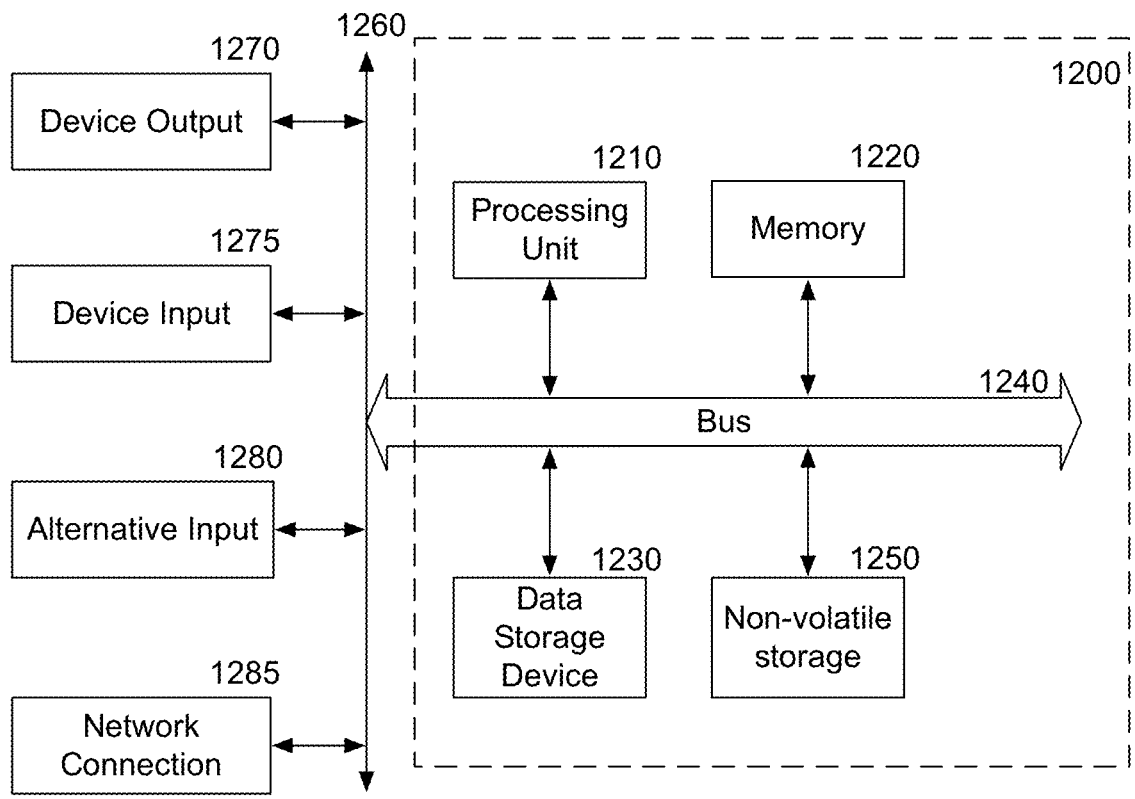
FIG. 12 is a block diagram of one embodiment of a computer system that may be used with the present application.

FIG. 12 is a block diagram of one embodiment of a computer system that may be used with the present invention. It will be apparent to those of ordinary skill in the art, however that other alternative systems of various system architectures may also be used.

The data processing system illustrated in FIG. 12 includes a bus or other internal communication means 1240 for communicating information, and a processing unit 1210 coupled to the bus 1240 for processing information. The processing unit 1210 may be a central processing unit (CPU), a digital signal processor (DSP), or another type of processing unit 1210.

The system further includes, in one embodiment, a random access memory (RAM) or other volatile storage device 1220 (referred to as memory), coupled to bus 1240 for storing information and instructions to be executed by processor 1210. Main memory 1220 may also be used for storing temporary variables or other intermediate information during execution of instructions by processing unit 1210.

The system also comprises in one embodiment a read only memory (ROM) 1250 and/or static storage device 1250 coupled to bus 1240 for storing static information and instructions for processor 1210. In one embodiment, the system also includes a data storage device 1230 such as a magnetic disk or optical disk and its corresponding disk drive, or Flash memory or other storage which is capable of storing data when no power is supplied to the system. Data storage device 1230 in one embodiment is coupled to bus 1240 for storing information and instructions.

The system may further be coupled to an output device 1270, such as a cathode ray tube (CRT) or a liquid crystal display (LCD) coupled to bus 1240 through bus 1260 for outputting information. The output device 1270 may be a visual output device, an audio output device, and/or tactile output device (e.g., vibrations, etc.)

An input device 1275 may be coupled to the bus 1260. The input device 1275 may be an alphanumeric input device, such as a keyboard including alphanumeric and other keys, for enabling a user to communicate information and command selections to processing unit 1210. An additional user input device 1280 may further be included. One such user input device 1280 is cursor control device 1280, such as a mouse, a trackball, stylus, cursor direction keys, or touch screen, may be coupled to bus 1240 through bus 1260 for communicating direction information and command selections to processing unit 1210, and for controlling movement on display device 1270.

Another device, which may optionally be coupled to computer system 1200, is a network device 1285 for accessing other nodes of a distributed system via a network. The communication device 1285 may include any of a number of commercially available networking peripheral devices such as those used for coupling to an Ethernet, token ring, Internet, or wide area network, personal area network, wireless network, or other method of accessing other devices. The communication device 1285 may further be a null-modem connection, or any other mechanism that provides connectivity between the computer system 1200 and the outside world.

Note that any or all of the components of this system illustrated in FIG. 12 and associated hardware may be used in various embodiments of the present invention.

It will be appreciated by those of ordinary skill in the art that the particular machine that embodies the present invention may be configured in various ways according to the particular implementation. The control logic or software implementing the present invention can be stored in main memory 1220, mass storage device 1230, or other storage medium locally or remotely accessible to processor 1210.

It will be apparent to those of ordinary skill in the art that the system, method, and process described herein can be implemented as software stored in main memory 1220 or read only memory 1250 and executed by processor 1210. This control logic or software may also be resident on an article of manufacture comprising a computer readable medium having computer readable program code embodied therein and being readable by the mass storage device 1230 and for causing the processor 1210 to operate in accordance with the methods and teachings herein.

The present invention may also be embodied in a handheld or portable device containing a subset of the computer hardware components described above. For example, the handheld device may be configured to contain only the bus 1240, the processor 1210, and memory 1250 and/or 1220.

The handheld device may be configured to include a set of buttons or input signaling components with which a user may select from a set of available options. These could be considered input device # 1 1275 or input device # 2 1280. The handheld device may also be configured to include an output device 1270 such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above, such as a robotic cell. For example, the appliance may include a processing unit 1210, a data storage device 1230, a bus 1240, and memory 1220, and no input/output mechanisms, or only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism. In one embodiment, the device may not provide any direct input/output signals, but may be configured and accessed through a website or other network-based connection through network device 1285.

It will be appreciated by those of ordinary skill in the art that any configuration of the particular machine implemented as the computer system may be used according to the particular implementation. The control logic or software implementing the present invention can be stored on any machine-readable medium locally or remotely accessible to processor 1210. A machine-readable medium includes any mechanism for storing information in a form readable by a machine (e.g., a computer). For example, a machine readable medium includes read-only memory (ROM), random access memory (RAM), magnetic disk storage media, optical storage media, flash memory devices, or other storage media which may be used for temporary or permanent data storage. In one embodiment, the control logic may be implemented as transmittable data, such as electrical, optical, acoustical, or other forms of propagated signals (e.g., carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A robotic cell calibration method comprising:
providing a robotic cell system having elements comprising: one or more cameras, one or more sensors, components, and a robotic arm;
localizing positions of the one or more cameras and components relative to a position of the robotic arm within the robotic cell using a common coordinate frame;
moving the robotic arm in a movement pattern under a first load, and using the cameras and sensors to determine robotic arm position at multiple times during the movement;
moving the robotic arm in the movement pattern under a second load and using the cameras and sensors to determine the robotic arm position at multiple times during the movement;
identifying a discrepancy in robotic arm position between a predicted position in the movement pattern and the determined robotic arm position in real time, for the first load and the second load;
computing, by an auto-calibrator, a compensation for the identified discrepancy, the auto-calibrator solving for the elements in the robotic cell system as a system; and
modifying actions of the robotic arm in real time during the movement based on the compensation to reduce the identified discrepancy in the robotic arm position.

2. The robotic cell calibration method of claim 1, further comprising:
forming a virtual representation of the robotic cell system that tracks at least some actions of the robotic cell using the localized position of the cameras, the sensors, and the robotic arm, the virtual representation used by the auto-calibrator.

3. The robotic cell calibration method of claim 1, further comprising:
determining if robotic arm position is within a determined accuracy range; and
initiating a recalibration by the auto-calibrator when the robotic arm is outside the determined accuracy range.

4. The robotic cell calibration method of claim 1, further comprising providing continuous calibration of robotic arm position as the robotic arm moves through movement patterns.

5. The robotic cell calibration method of claim 1, further comprising performing a pre-use calibration comprising:
selecting robotic arm movement patterns to improve position localization of components visible in an observable volume of the robotic cell; and
performing the selected robotic arm movement patterns while an object including one or more fiducials is attached to the robotic arm.

6. The robotic cell calibration method of claim 1, further comprising calibrating the one or more cameras, the calibrating accounting for camera lens distortion.

7. The robotic cell calibration method of claim 1, further comprising performing a pre-calibration comprising:
building a position accuracy map with position metrics for the robotic arm; and
adjusting the movement patterns based on the position accuracy map.

8. The robotic cell calibration method of claim 1, wherein the computing comprises modelling dynamic and static components in the robotic cell system.

9. The robotic cell calibration method of claim 1, further comprising:
performing idle time calibration by performing calibration refinement steps on idle cycles of a processor while the robotic cell is in use, the idle time calibration determining whether the robotic cell remains calibrated.

10. The robotic cell calibration method of claim 1, wherein the method comprises an initial calibration when the robotic cell is not in use.

11. The robotic cell calibration method of claim 10, wherein the method comprises an in-use calibration, applied while the robotic cell is in use, to update calibration to address changes in the robotic cell during the use.

12. A robotic cell system comprising:
one or more cameras;
one or more sensors;
a robotic arm;
a processor configured to:
perform a pre-calibration comprising:
building a position accuracy map with position metrics for the robotic arm; and
adjusting a movement pattern based on the position accuracy map;
localize positions of cameras and components relative to a position of the robotic arm within the robotic cell using a common coordinate frame;
control movement of the robotic arm in the movement pattern under a first load and using the cameras and the sensors to determine robotic arm position at multiple times during the movement;
control movement of the robotic arm in the movement pattern under a second load and using the cameras and the sensors to determine robotic arm position at multiple times during the movement;
identify a discrepancy in robotic arm position between a predicted position in the movement pattern and the determined robotic arm position in real time, for the first load and the second load;
compute, by an auto-calibrator, a compensation for the identified discrepancy, the auto-calibrator solving for elements in the robotic cell system as a system; and
modify actions of the robotic arm in real time during the movement based on the compensation to reduce the identified discrepancy in the robotic arm position.

13. The robotic cell system of claim 12, further comprising:
the processor further configured to form a virtual representation of the robotic cell system that tracks at least some actions of the robotic cell using the localized position of the cameras, the sensors, and the robotic arm, the virtual representation used by the auto-calibrator.

14. The robotic cell system of claim 12, further comprising the processor configured to determine if robotic arm position is within a determined accuracy range, and initiate a recalibration by the auto-calibrator when the robotic arm is outside the determined accuracy range.

15. The robotic cell system of claim 12, wherein the system provides a continuous calibration of robotic arm position as the robotic arm moves through movement patterns.

16. The robotic cell system of claim 12, further comprising:
robotic controls configured to move the robotic arm under varying loads, at varying speeds, and moving along varying paths identify the discrepancy.

17. The robotic cell system of claim 12, further comprising:
an auto-calibrator configured to perform a pre-use calibration including:
selecting robotic arm movement patterns to improve position localization of components visible in an observable volume of the robotic cell; and
performing the selected robotic arm movement patterns while an object including one or more fiducials is attached to the robotic arm.

18. The robotic cell system of claim 12, wherein the processor is configured to perform idle time calibration by performing calibration refinement steps on idle cycles of a processor while the robotic cell is in use, the idle time calibration determining whether the robotic cell remains calibrated.

19. A method to calibrate a robotic cell system including a robotic arm and one or more cameras, the method comprising:
moving the robotic arm in a movement pattern under a first load and using the cameras to determine robotic arm positions at multiple times during the movement pattern;
moving the robotic arm in the movement pattern under a second load and using the cameras to determine robotic arm positions at multiple times during the movement pattern;
identifying a discrepancy in robotic arm position between a predicted position in the movement pattern and the determined robotic arm position in real time, for the first load and the second load;
computing, by an auto-calibrator, a compensation for the identified discrepancy, the auto-calibrator solving for elements in the robotic cell system as a system; and
modifying actions of the robotic arm during use based on the compensation to reduce the identified discrepancy in the robotic arm position.

20. The method of claim 19, further comprising:
creating one or more movement patterns to such that a path traced by the movement pattern is visible to the one or more cameras; and
performing the movement patterns while an object including one or more fiducials is attached to the robotic arm.

* * * * *